US008108240B2

(12) United States Patent  
Gropper

(10) Patent No.: US 8,108,240 B2  
(45) Date of Patent: Jan. 31, 2012

(54) BUSINESS CARD AND CONTACT MANAGEMENT SYSTEM

(76) Inventor: Robert L. Gropper, Seattle, WA (US)

( * ) Notice: Subject to any disclaimer, the term of this patent is extended or adjusted under 35 U.S.C. 154(b) by 1120 days.

(21) Appl. No.: 11/109,974

(22) Filed: Apr. 19, 2005

(65) Prior Publication Data

US 2005/0251448 A1 Nov. 10, 2005

(51) Int. Cl.  
*G06F 9/46* (2006.01)
(52) U.S. Cl. .................................................. 705/7.18
(58) Field of Classification Search ............... 705/9, 7.18
See application file for complete search history.

(56) References Cited

U.S. PATENT DOCUMENTS

| | | |
|---|---|---|
| 4,334,268 A | 6/1982 | Boney et al. |
| 4,742,453 A | 5/1988 | Shibuya |
| 4,754,393 A | 6/1988 | Kitson et al. |
| 5,081,574 A | 1/1992 | Larsen et al. |
| 5,148,531 A | 9/1992 | Shiraishi |
| 5,193,157 A | 3/1993 | Barbour et al. |
| 5,228,131 A | 7/1993 | Ueda et al. |
| 5,321,820 A | 6/1994 | Nakajima |
| 5,371,862 A | 12/1994 | Suzuki et al. |
| 5,418,917 A | 5/1995 | Hiraoka et al. |
| 5,430,854 A | 7/1995 | Sprague et al. |
| 5,493,105 A | 2/1996 | Desai |
| 5,517,628 A | 5/1996 | Morrison et al. |
| 5,572,643 A | 11/1996 | Judson |
| 5,574,930 A | 11/1996 | Halverson, Jr. et al. |
| 5,625,837 A | 4/1997 | Popescu et al. |
| 5,652,910 A | 7/1997 | Boutaud et al. |
| 5,659,722 A | 8/1997 | Blaner et al. |
| 5,710,884 A | 1/1998 | Dedrick |
| 5,732,218 A | 3/1998 | Bland et al. |
| 5,737,619 A | 4/1998 | Judson |
| 5,740,549 A | 4/1998 | Reilly et al. |

(Continued)

OTHER PUBLICATIONS

Burke "Sharp pushes Zaurus as desktop unit", Nov. 1996, Computer Reseller News n709, Dialog file 15, Accession No. 01340020.*

*Primary Examiner* — Romain Jeanty  
(74) *Attorney, Agent, or Firm* — Lowe Graham Jones PLLC

(57) ABSTRACT

An Internet (or World-Wide-Web or other such public or private network) based business card and contact management system capable of conveying and managing advertising as well as traditional and other non-traditional business contact information. The invention is a system that: (1) accepts a Universal Contact Locator (UCL) as encoded on a business card in man and/or machine readable format and, when the Universal Contact Locator (UCL) is entered into a client program running on a client computer, (2) causes a web browser (or like program) and associated communications software to establish a communications session with a remote server computer which (3) accesses the stored contact and advertisement and news information of the card issuer associated with the Universal Contact Locator and (4) downloads the business contact and/or personal contact information and targeted advertisements and news items associated with the Universal Contact Locator to a client program running on a client computer which (5) loads the contact data into the Contact Management or Personal Information Management (PIM) system of the users choosing running on the users client computer and (6) stores the advertisements and news items downloaded from the server computer on the client computer's secondary storage device (i.e. hard disk) and (7) causes the advertisements and news items stored on the client computer's secondary storage device to be displayed to the user on a predetermined schedule in a portion of the client computer's output device (i.e. CRT or LCD panel).

17 Claims, 22 Drawing Sheets

U.S. PATENT DOCUMENTS

| | | |
|---|---|---|
| 5,809,242 A | 9/1998 | Shaw et al. |
| 5,848,397 A | 12/1998 | Marsh et al. |
| 5,873,095 A | 2/1999 | Gore |
| 5,903,721 A | 5/1999 | Sixtus |
| 5,933,827 A * | 8/1999 | Cole et al. .................. 707/10 |
| 6,064,979 A | 5/2000 | Perkowski |
| 6,081,840 A * | 6/2000 | Zhao ............................ 709/224 |
| 6,115,641 A | 9/2000 | Brown et al. |
| 6,256,661 B1 * | 7/2001 | Terahama et al. ............ 709/201 |
| 6,269,369 B1 * | 7/2001 | Robertson ..................... 707/10 |
| 6,314,426 B1 | 11/2001 | Martin et al. |
| 6,338,057 B1 * | 1/2002 | Weeks ............................. 707/3 |
| 6,421,675 B1 * | 7/2002 | Ryan et al. .................... 707/100 |
| 6,654,725 B1 * | 11/2003 | Langheinrich et al. .... 705/14.52 |
| 6,714,916 B1 | 3/2004 | Robertson et al. |
| 7,003,546 B1 * | 2/2006 | Cheah et al. .................. 709/200 |
| 2002/0120927 A1 | 8/2002 | Harada et al. |
| 2003/0101092 A1 | 5/2003 | Fuller et al. |

* cited by examiner

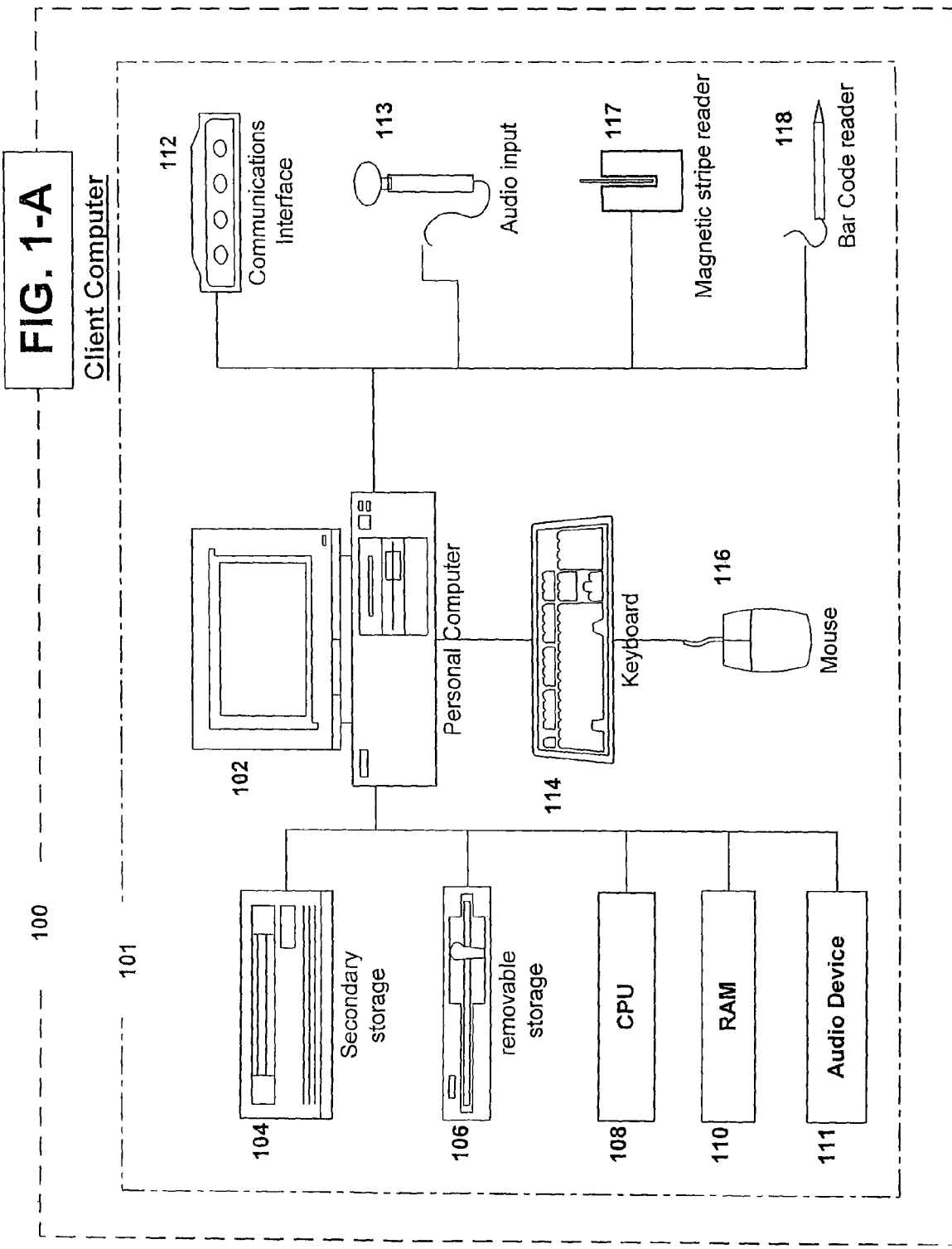

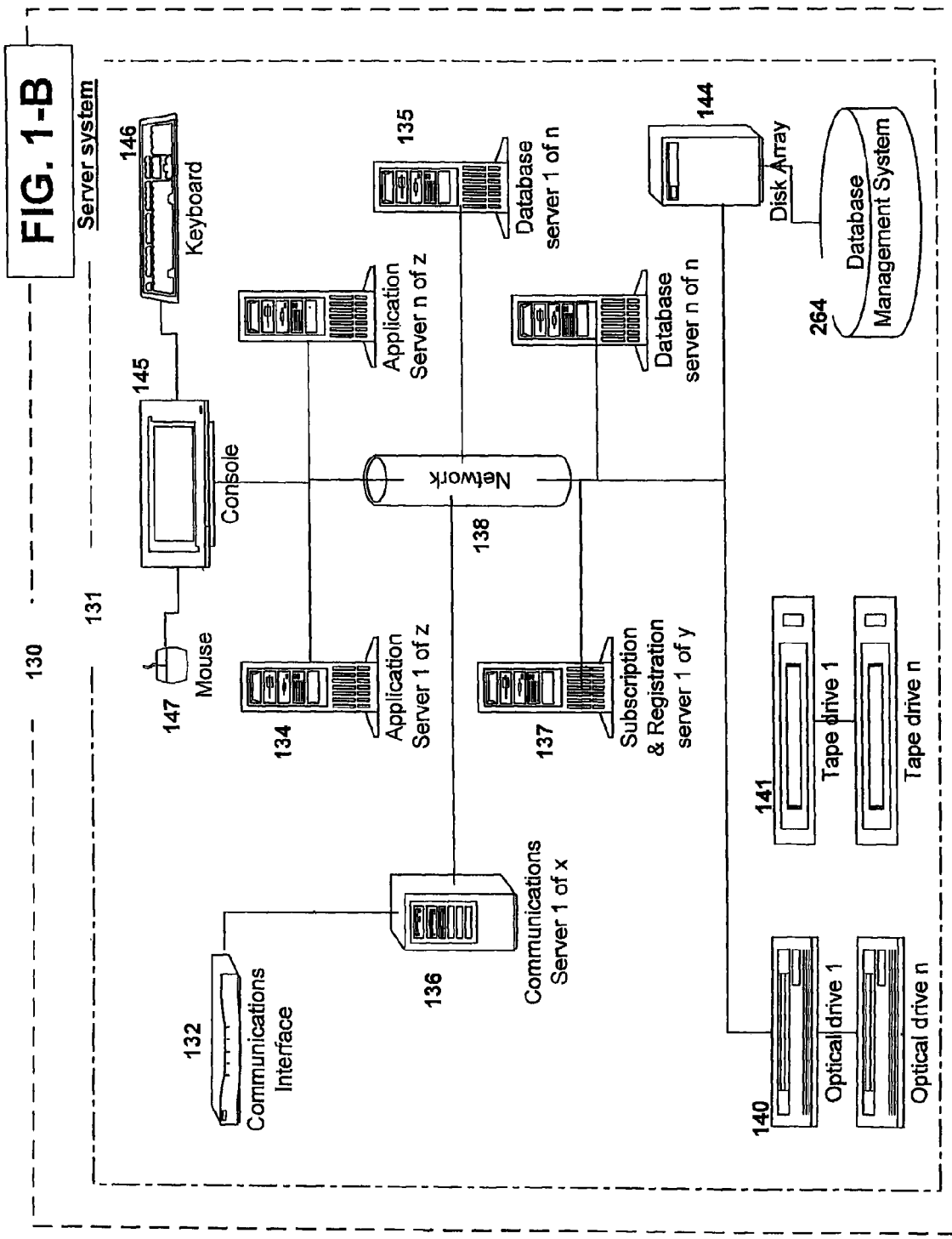
FIG. 1-B

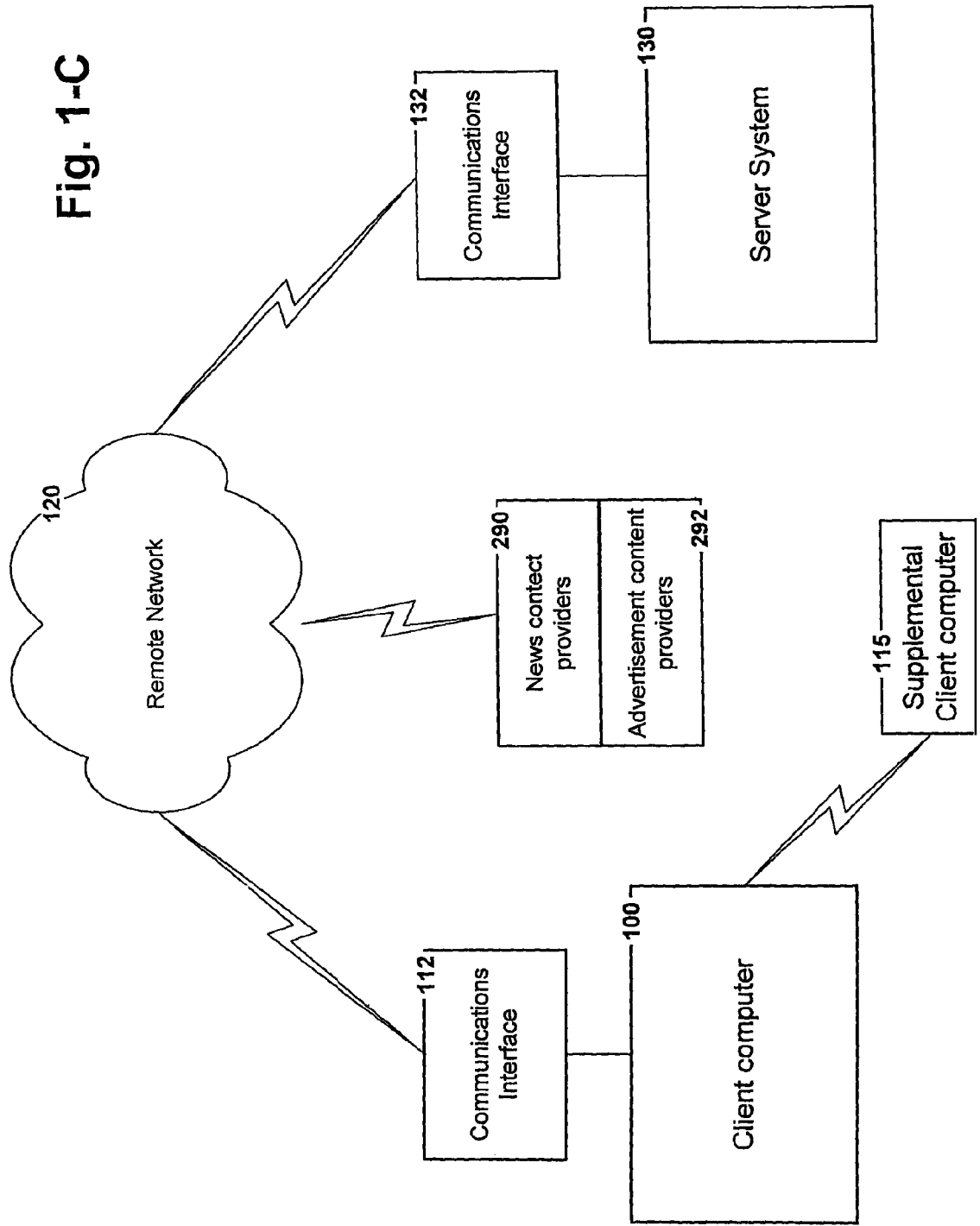

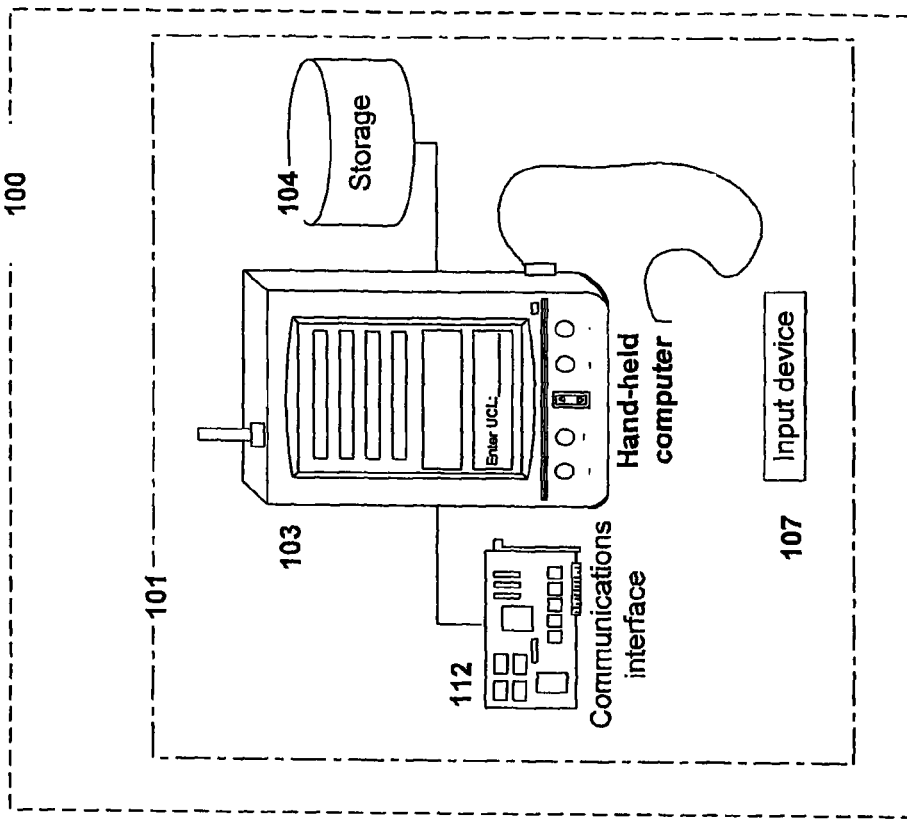
FIG. 1-E
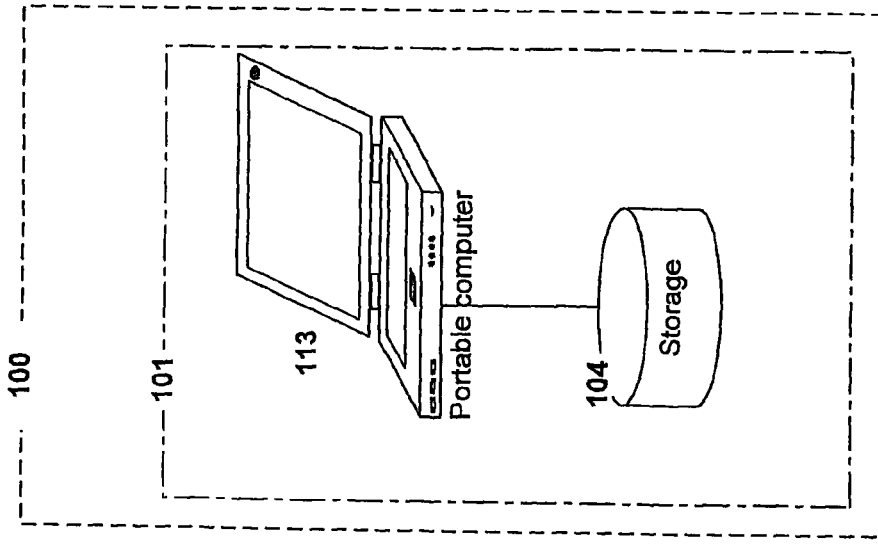
FIG. 1-D

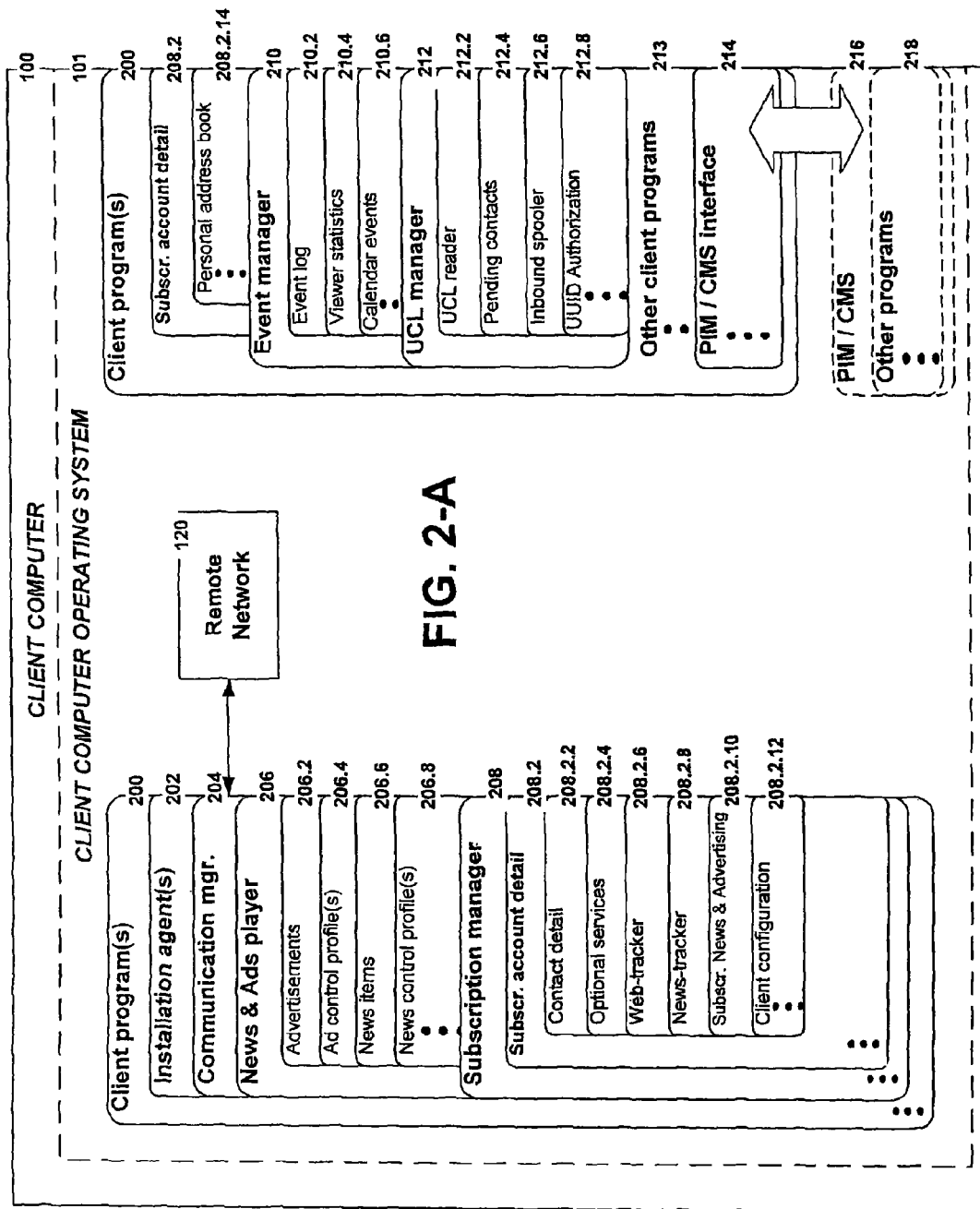
FIG. 2-A

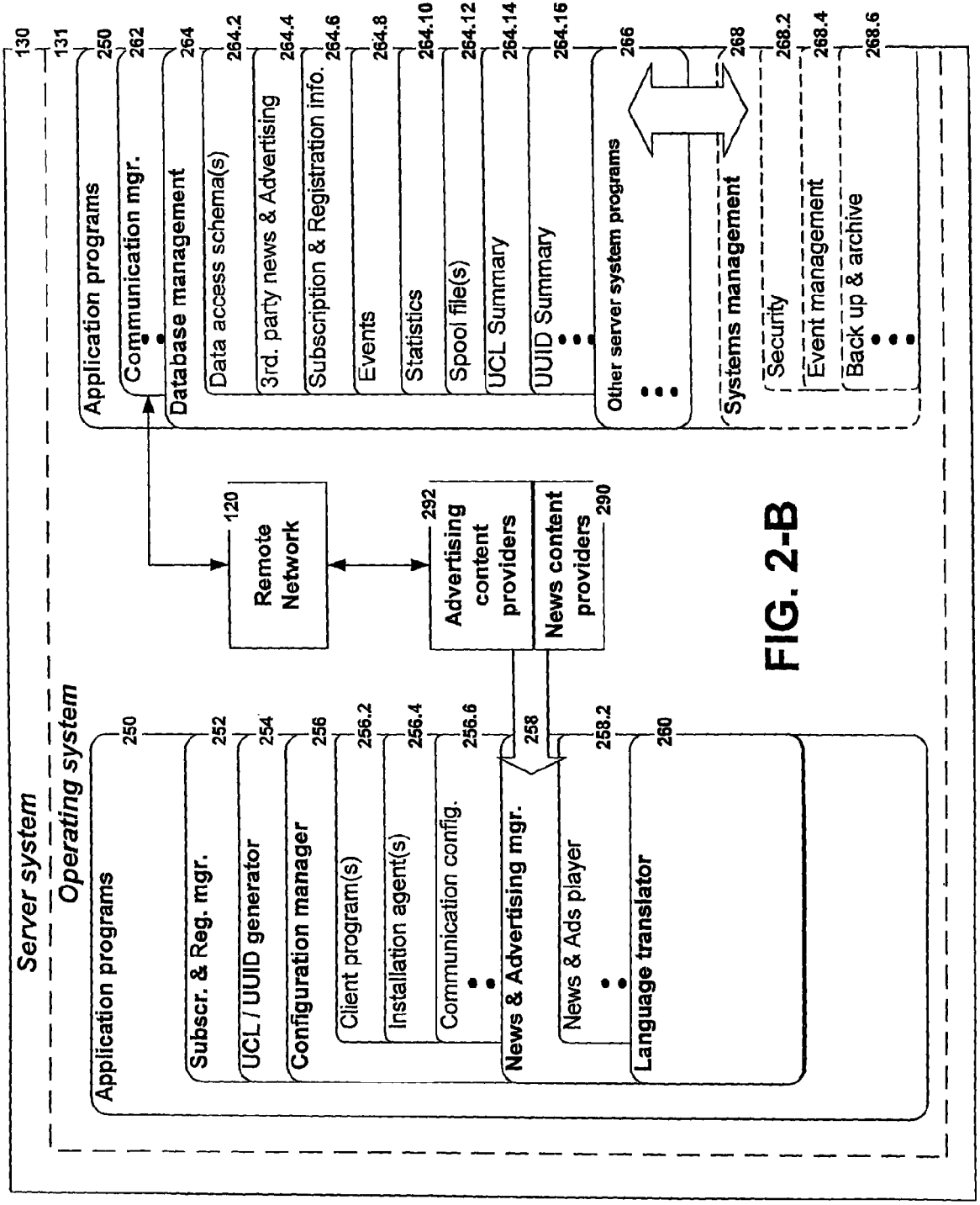
FIG. 2-B

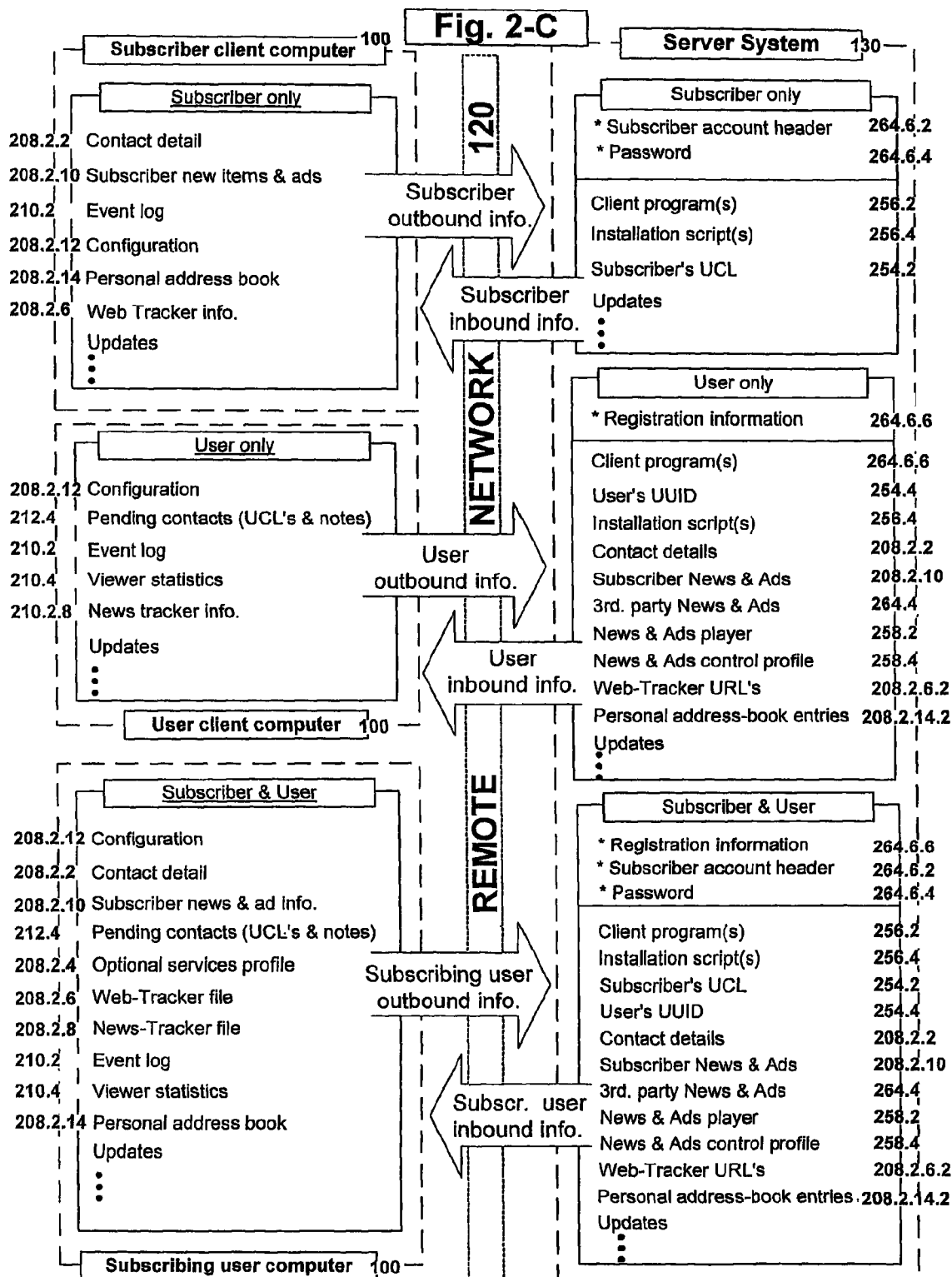

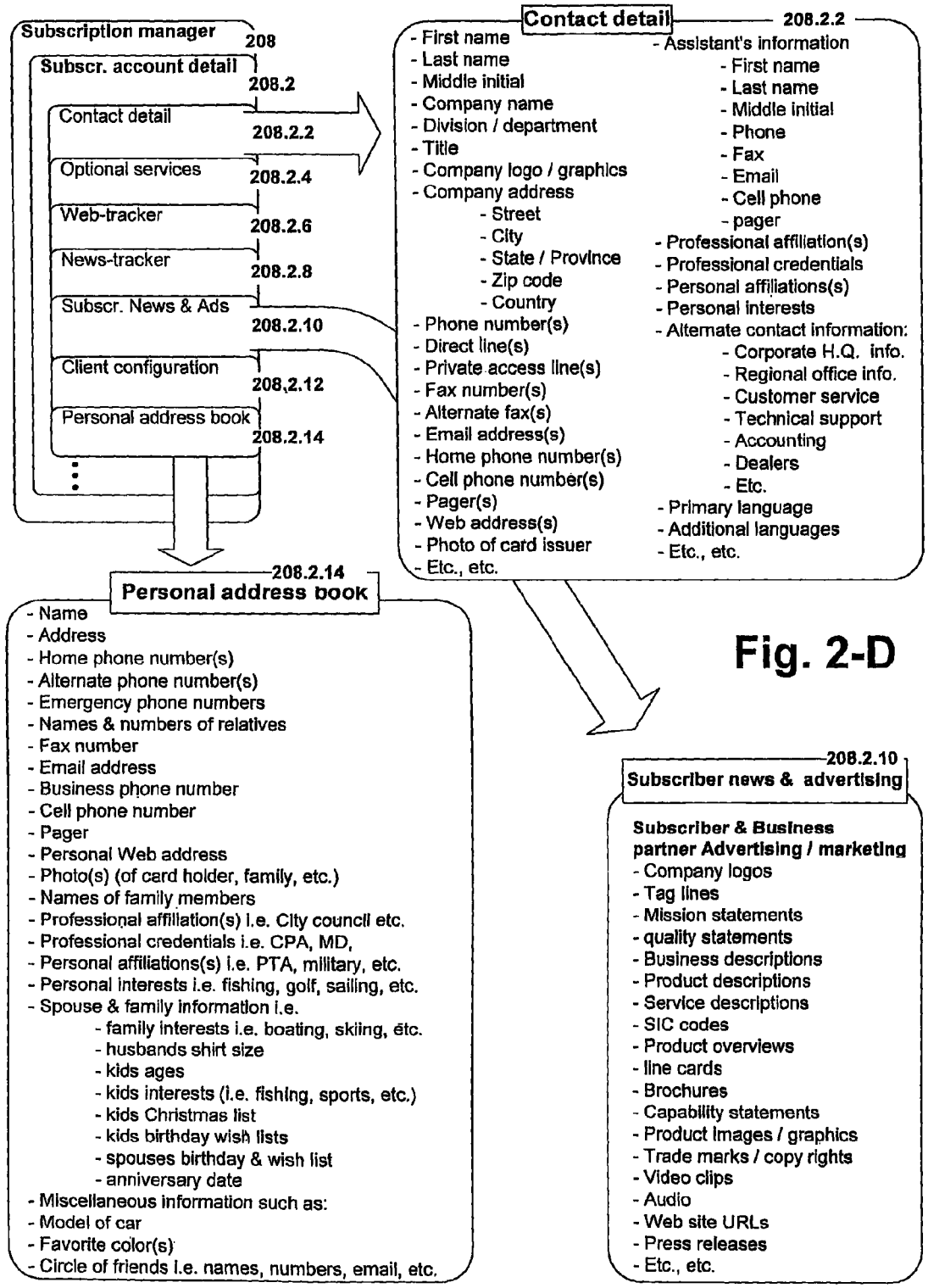
Fig. 2-D

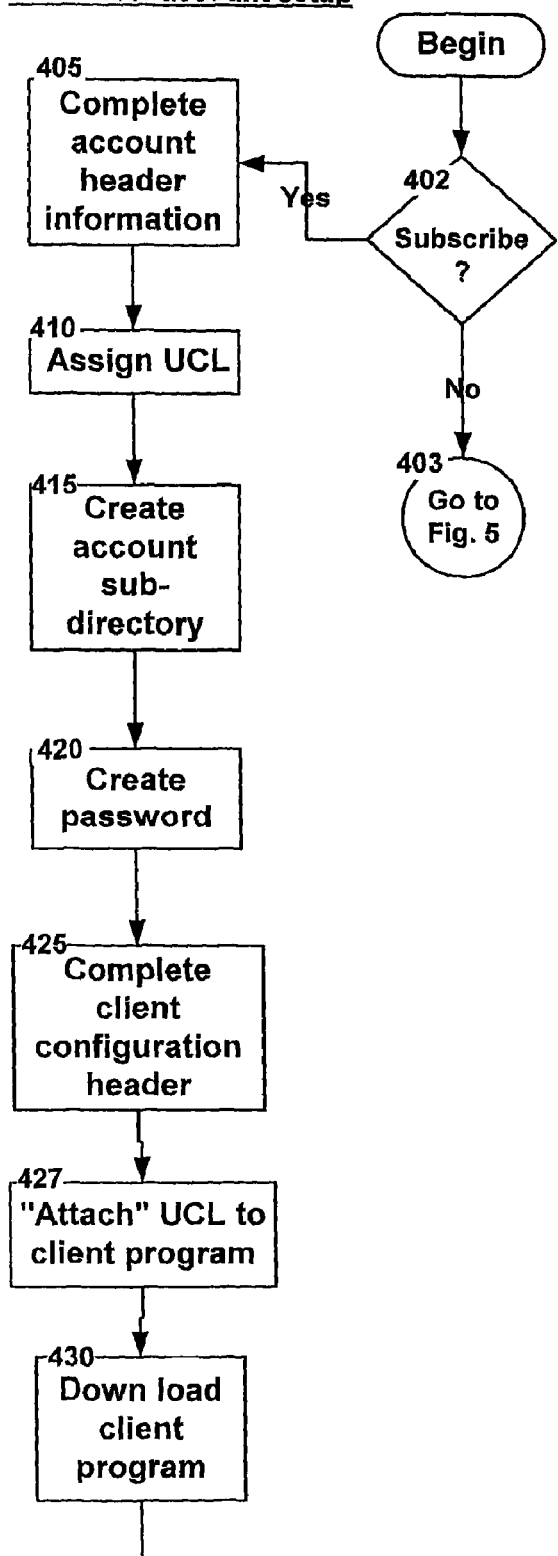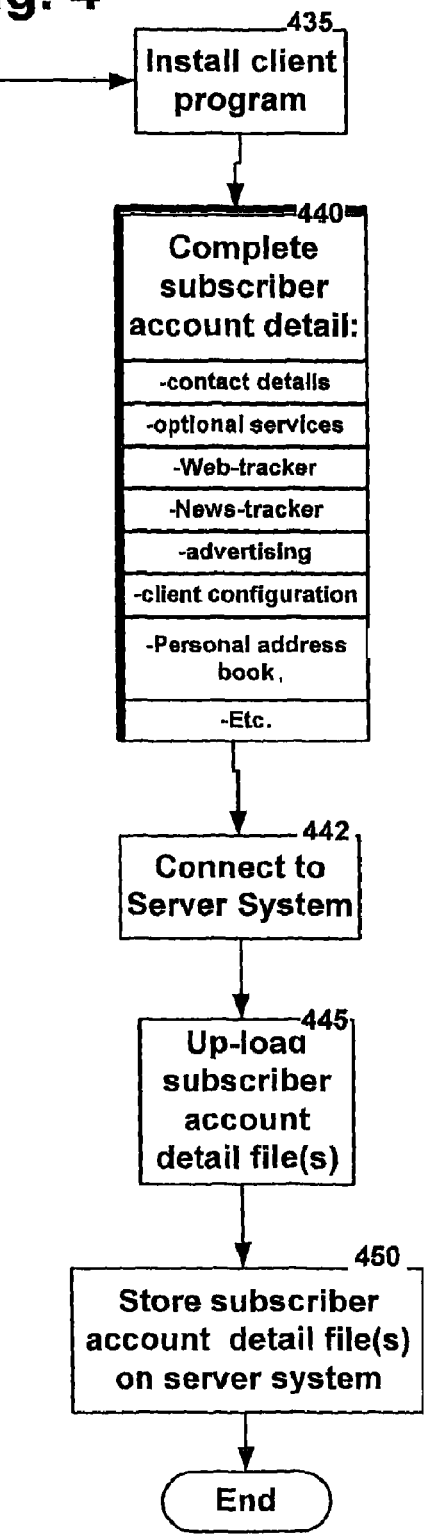
Fig. 4

Registered user account setup

Client functions
(enter UCL's)

Server functions

Server functions

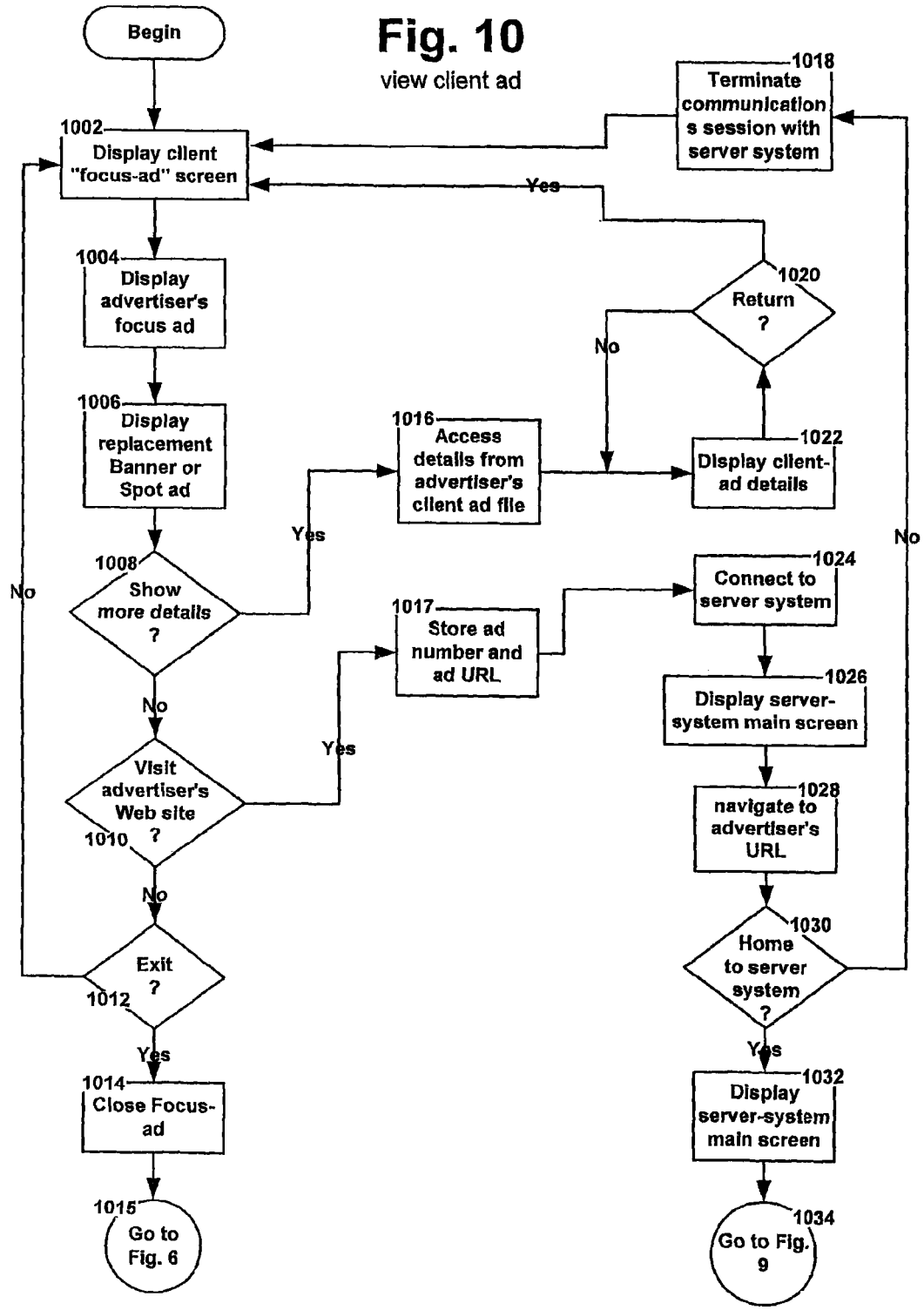

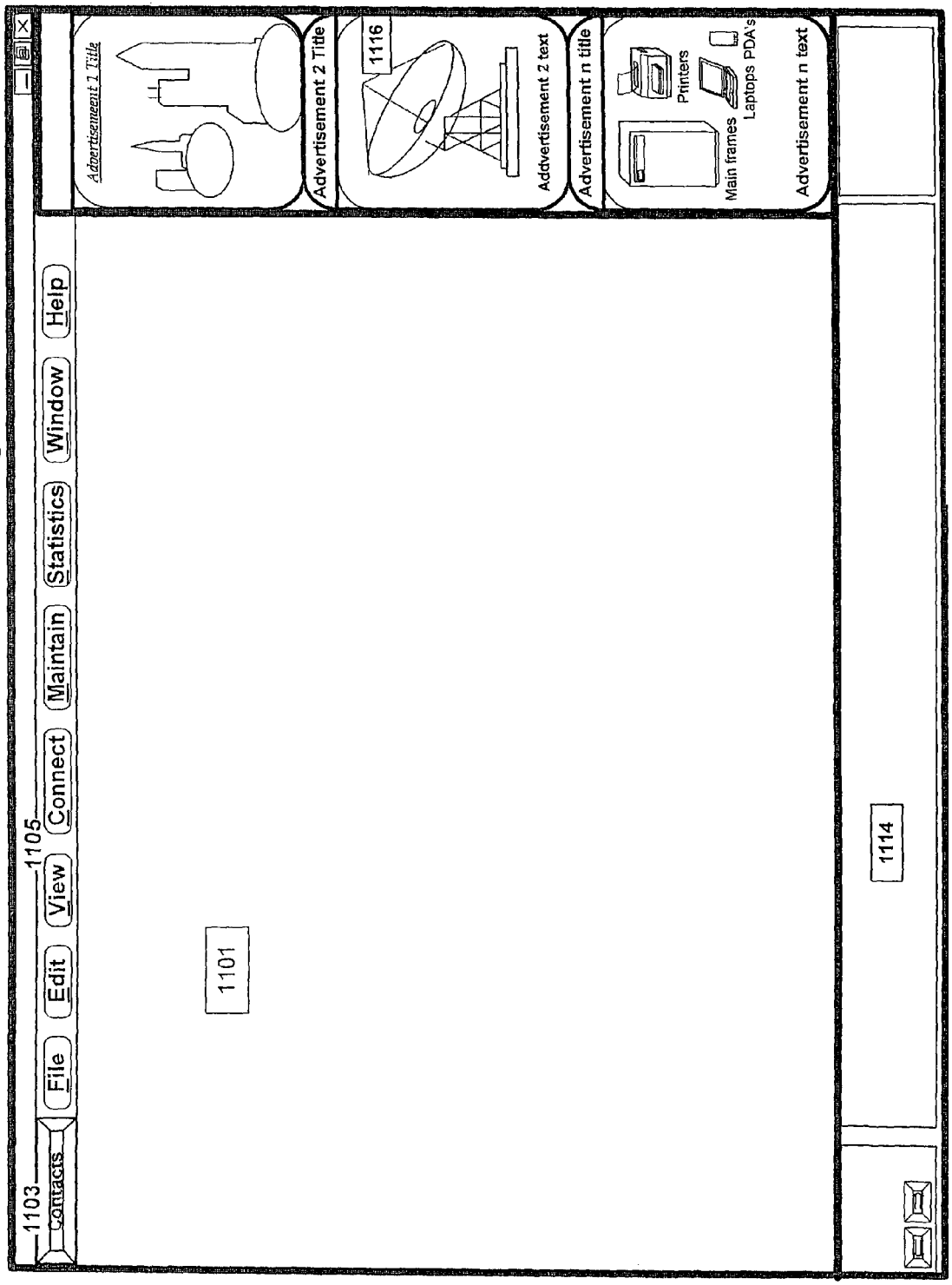
Fig. 11-A

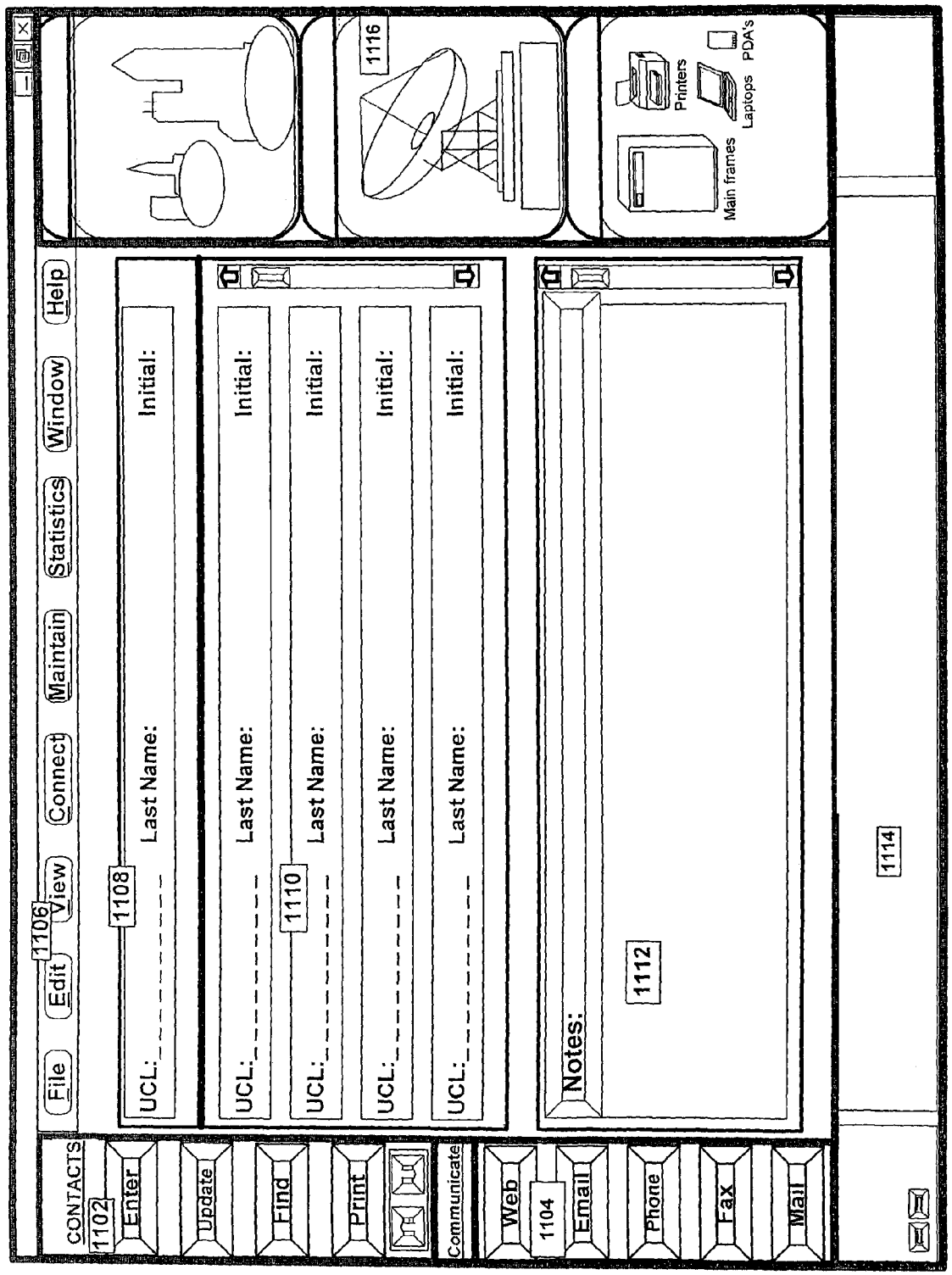
Fig. 11-B Client program screen

FIG. 13 Server System screen

FIG. 14  Server system screen

BUSINESS CARD AND CONTACT MANAGEMENT SYSTEM

BACKGROUND OF THE INVENTION

Management of business and personal contact information is a vital part of every business-person's job. It is a long-standing tradition, world-wide, for business people (and personal acquaintances) to exchange business cards upon their first (and possibly subsequent) meeting. There currently exists a significant market for manufacturers of manual business card holders/files and for developers and retailers of software and electronic hardware products to manage personal and business contact information. The electronic systems are commonly referred to as PIM's (Personal Information Managers) or CMS systems (Contact/Customer Management Systems). The PIM and CMS systems vary in their functionality from small, credit-card sized electronic address books to large corporate-wide customer management systems.

All of the systems have one common flaw, however, in that the task of entering the original contact information is time consuming and error prone. The task of entering all the basic contact information from the business card into the PIM/CMS such as, for example, the card holder's name, address, phone and fax numbers, email address, etc. is by nature a labor intensive task. Because the task is manual, it is prone to data entry errors. Often times the errors are not realized until the user later extracts the data from the PIM/CMS and attempts to contact the card issuer and fails because, for example, a phone or fax number is wrong or a zip code has two digits transposed. Entry of contact data into a PIM/CMS is expensive because of the labor involved. The expense is compounded when errors are realized after the fact when mail is returned, faxes are not received in a timely manner or phone contact cannot be made. There exists therefore, a need for a system to reduce or eliminate the labor and errors associated with the manual data entry of contact information into a PIM/CMS.

Commercially available solutions to automate the data entry process of entering business contact information are limited. Today, the state of the art consists of optical card scanning devices. These devices such as the Smart Business Card Reader from Seiko and the CardScan Plus from Corex Technologies consist of an optical document scanner and OCR (Optical Character Recognition) software. The optical scanner scans the image(s) printed on the front of the business card and the OCR software attempts to determine which characters make up which fields of information. The software then attempts to place the data into the database of an attached PIM/CMS. This technology is expensive and error prone. Though less labor intensive than manual data entry it is often more error prone than hand data entry.

Another limitation exists for the business card issuer. A printed business card can convey only a limited amount of information. Face-to-face delivery of information is often the most effective advertising medium. The ability to hand-deliver an advertising message to a business or personal acquaintance is highly effective and a desirable marketing goal. Even with the state of the art in electronic and print advertising, there still exists a significant need for people to meet in person. The business card issuer is faced with the dilemma of wanting to print (convey) as much information as possible on a business card without the card becoming cluttered and confusing to the recipient. A partial answer to this dilemma is to print information on both the front and back of the business card (which presents a problem for optical card scanners) or to produce a card that folds in the middle, much like a book, thus providing multiple surfaces on which to print information. These solutions are expensive for the card issuer as printing costs can increase significantly and often annoying to the recipient. There exists, therefore, a need for a system that will allow a business card issuer to convey larger amounts of contact related information (than conventional business cards) to the recipient in a manner that is aesthetically pleasing (i.e. a business card that is not crowded with information), inexpensive to print and convenient for the recipient to manage.

In a business meeting, it is common for the participants to exchange advertising/marketing information. This advertising often takes the form of product brochures, service capability statements, product-line cards, videos, demonstration units, etc., in addition to the exchange of business cards. This process is expensive for the issuer (i.e. for the cost of the production, storage, and maintenance of marketing materials) and for the recipient who has to store the received literature, etc. in such a way as to make it readily accessible the next time it is needed. The recipient often files the business card in a manual card file or electronic PIM and the literature in a separate file which must be labeled and filed. This, again, is a manually intensive and expensive process for the recipient that often results in the literature/advertising information being disposed of or lost. Accordingly, there exists a need for a system that will allow the issuer of a business card to also actively convey targeted advertising/marketing information to a recipient in a manner that is cost effective and convenient for both the issuer and the receiver.

The Internet is fundamentally changing the way companies do business. One advantage of the Internet, especially for smaller companies, is that an advertiser can reach a potentially large audience simply by establishing a site on the World Wide Web. Unlike print advertising, electronic forms of advertising can be interactive and can often deliver more information to the viewer. A limitation and fundamental difficulty, however, is in attracting visitors to one's web site. Web advertising is a purely passive advertising method in which the customer must come to the advertiser, not visa versa. Search engines and cooperative web site advertising are common methods to attract visitors to an advertiser's web site. A common method for Internet advertisers is the "shotgun" approach whereby the advertiser pays for advertising space and time on the Web sites of many different business partners or "cooperative" web sites. The theory is that sooner or later, an interested prospect will eventually come across the advertiser's ad and take action to purchase the advertiser's product or service. A disadvantage to cooperative web site advertising is that it does not lend itself well to "targeted" advertising. It is also an expensive advertising method, especially for smaller companies who cannot afford to purchase ad space on high traffic web sites. Even if an advertiser can afford the ad space on a popular web site, advertisements are typically "rotated" through a site such that they are displayed on a periodic basis along with numerous other ads. As a result, it is highly likely that the advertiser's ad will not be displayed to each and every visitor to that web site. Often a more effective method of targeted electronic advertising which allows the advertiser to reach targeted prospective customers is for the advertiser to actively pursue their target audience by direct E-mail advertising. Direct E-mail advertising is a more active method which allows the advertiser to bring the message directly to the targeted recipient and is often less expensive than cooperative web site advertising. A disadvantage with direct E-mail is that many email service providers actively filter out "spam" or unsolicited email. Accordingly, there is a need for a method of electronic advertising and electronic advertisement delivery which allows for inexpensive delivery of electronic advertisements to a specifically targeted audience.

It is often difficult (or impossible) for advertisers to determine who is actually receiving and/or viewing their advertisements. Advertisers want to know the demographics of the viewers/recipients of their advertising. Statistics about the viewer/recipient of an ad such as when, where, and for how long they viewed the ad and the source of the ad (i.e. a retailer, staff sales person, business partner, or other such source) are desirable for advertisers. Information such as the viewer's job title, and company and how the viewer can be reached are also desirable pieces of information that are extremely difficult if not impossible for an advertiser to obtain without expensive surveys, etc. There exists, therefore, a need for a system that will allow advertisers to obtain detailed information about the viewer/recipient of advertising as well as the source and timing of the advertisement.

It is common for business partners to share in the costs of advertising. "Cooperative advertising", as it is sometimes referred, often involves multiple advertiser teaming together. Often the "team" consists of a global or national advertiser and a local re-seller of a product or service. Often, a re-seller of a product or service will print the logo and company name of one or more cooperative advertisers on his/her business card perhaps in an effort to increase name recognition, etc. This often results in a potentially confusing or crowded looking business card. Accordingly, there is a need for a business card format that allows cooperative advertisers to place logos, etc. from one or more business partners (advertisers) on (or within) one business card without causing the business card to look crowded or to cause confusion with the recipient.

SUMMARY OF THE INVENTION

The present invention provides business card issuers and receivers with a more efficient, more cost effective, more accurate, and less manually intensive method for conveying and managing business and personal contact information as well as news and advertising information.

The present invention provides a method to substantially reduce if not eliminate the labor and errors associated with manual data entry of contact information into a PIM/CMS. The present invention provides a method to deliver large amounts of contact related information. The present invention provides a method of actively delivering targeted advertising information to a recipient. The present invention provides a method to deliver a electronic advertisements and news information directly to a targeted recipients. The present invention provides a method of collecting detailed information about the recipient/viewer of advertising as well as the source and timing of the advertisement. The present invention provides a method of combining the logos and other advertisements of multiple businesses into a single business card.

In the present invention, a card holder (issuer) of business cards subscribes to a server system, thus becoming a subscriber, and provides all of his/her contact information to the server system.

The type of information that the subscriber will provide to the server system and which the present invention will store, communicate, and manage includes that information which is commonly printed on traditional business cards, such as; name, title, company name, phone number, address, fax number, email address, web address, etc. (as illustrated in FIG. 2-D). In addition to traditional business card information, the present invention will store and manage heretofore non-traditional business contact information such as mission statements, quality statements, capability statements, product descriptions, alternate contact information (such as home phone, cell phone, direct phone number, alternate office locations, etc.), assistant information (i.e. assistant's name, phone, email address, etc.), professional affiliations (such as for example, MD, JD, DDS, CPA, etc.), personal affiliations (such as charities, alma mater, military, religion, etc.), personal interests (such as golf, fishing, skiing, etc.) and virtually any other information that might be of interest for a business card holder to convey to a recipient. Additionally, the present invention will allow the subscriber to convey new types of information that heretofore have not been possible with traditional business cards and contact management systems. Data types such as audio, video, digital images, etc. will allow the subscriber to convey company news items and advertisements, product brochures, complete product and service descriptions, as well as business partner news and advertisements directly to the user's computer. Direct conveyance of targeted news and advertising (both company and business partner) is a key capability of the present invention.

It will be appreciated that more or less contact information may be provided by the subscriber and that FIG. 2-D is only a representative example of the contact information that may be provided with the present invention. In addition to contact information, news and advertisements relating to the subscriber and/or the subscriber's company as well as news and advertisements relating to the subscriber's business partners (i.e. dealers, service providers, suppliers, etc.), are conveyed from the subscriber to the server system. The subscriber also conveys to the server system advertisement control profiles and associates them with each ad submitted. The news and advertisement control profiles describe how and when the ad (or news item) is displayed and includes, but is not limited to the size and shape of the ad, the effective start and stop dates the ad is to run, etc.

The file on the server system in which the card issuer's contact and advertising information is stored is represented by a unique alpha numeric identifier referred to herein as a Universal Contact Locator or "UCL". In the representative embodiment of the present invention, business cards belonging to the subscriber are encoded with the subscriber's UCL. The UCL may be printed on the subscriber's business card in human readable format and/or one or more machine readable format(s) such as, for example, bar code, magnetic stripe, etc. The UCL encoded on the subscriber's business card corresponds to the UCL which identifies the unique data file on the server system which contains the business contact information and advertisements of the subscriber.

The present invention is also applicable to a variety of personal identification/social communication media such as greeting cards, stationary, electronic mail, etc. Likewise, a UCL encoded/printed on the personal /social communication media of the "sender" corresponds to a unique data file located in the server system which contains the personal/ social contact information and/or advertising of the sender. For purposes of clarity, only the application of the present invention to business contact and advertising information conveyance and management is described herein, but it will be appreciated that the system will function substantially the same for personal/social communication media. FIG. 2-D illustrates representative "personal address book" information that may be managed by the present invention.

A user, i.e. a recipient of business cards, may or may not be (or become) a subscriber. A first-time user registers (on a one time basis) with the server system and provides certain contact information to the server system such as, for example, his/her name, title, company name, address, phone number, email address, etc.

Once the user has registered with the server system the client program is down-loaded from the server system via the network or mailed to the user and installed on the client computer. The client program incorporates an information database or similar file structure/file management system for management of the client program(s), files, and data.

Upon receipt of a business card or other social communication media which is encoded with a UCL, the recipient enters the UCL into the client program running on the client computer. It will be appreciated that the UCL may also be communicated to the user (recipient) verbally or by any other means. The client computer is equipped with a manual and/or automated data entry device(s) as described herein. When entering the UCL, it is not necessary that the client system be connected to or communicating with the server system. In practice, it may be common that the client system is not connected to or in communication with the server system when the UCL is being entered. The client program stores the entered UCL(s).

Once the UCL(s) is entered into the client program, the client program will continue accepting and storing UCL(s) until such time as the user causes the client computer to establish an electronic (either wire or wireless) connection with the Internet (or other such remote network as described herein). The method(s) for establishing communication with another computer via the Internet is well known in the art.

Once the client program has caused the user's client computer to establish an electronic communication session with the server system, regardless of the process that caused the connection (i.e. manual or automated), the client program then passes the stored UCL(s) to the server system. The client program also passes information contained in other files such as the log file, the statistics file, the configuration file, the web tracker file, and others, described in greater detail herein, to the server system. The server system accesses the subscriber's file(s) (stored on the server system) that are associated with the UCL(s) that were just passed to the server system from the client program. The server system passes the contact and advertising information associated with the subscriber(s) UCL to the client program via the remote network. The server system also passes update information to the client program. Program updates (patches, bug fixes, new features, etc.) are sent to the configuration file. New communications parameters such as modem configurations, access phone numbers, device URL'S, etc. are also down-loaded to the configuration file. Changes that subscribers have made to their subscriber account information (i.e. contact information, news and advertisement information, web tracker lists, etc.) are also downloaded to the client program. The information downloaded from the server system to the client computer is often referred to herein as "inbound information".

Once all the appropriate information (inbound information) has been down-loaded from the server system to the client computer, the server system terminates the communication session with the client program. The client program will then cause the appropriate contact data to be stored in the appropriate locations within the designated CMS/PIM. The user can then use the CMS/PIM as usual to create, edit, store, retrieve, output, and otherwise manipulate business and personal contact information. The client program will also store the news items and advertisements downloaded from the server system in the "news items" and "advertisement" files for later display by the "news and ads player". The configuration, statistics, and ad control information are stored in their respective files as well.

Advertisements: The present invention provides for the delivery of advertising and news content to users and subscribers. For purposes of clarity, as used herein, the term "advertising" or "advertisement", or "ad" refers to both advertising and news content or news item. Subscribers submit advertisements to the server system for storage on the server system. Ads can be textural, graphical (still or animated), video, audio or a combination. News items and advertisements are generally divided into two categories; "CLIENT ADS" and "SERVER ADS". Client ads are downloaded to the client computer (along with other inbound information) for display on the client computer while the client computer is off-line with respect to the server system. Server ads remain on the server system and are displayed to users when the client computer is on-line with respect to the server system. Otherwise, client ads and server ads are essentially identical.

The appropriate ads (according to an ad display schedule) are down loaded to the client program for display to users. Banner ads and spot ads are displayed continually at the periphery of the client screen (typically top and bottom of the screen for banner ads and on the right or left side of the screen for spot ads). Focus ads are displayed as a result of the user selecting (typically by "clicking" on) either a banner or spot ad. Focus ads are also automatically displayed during the time the client program is establishing connection with the server system. Server ads are displayed while the client and server systems are updating their .respective inbound and outbound files (i.e. contact and ad information, log, statistic, ad control, web tracker files, etc.). Client focus ads or server ads may also be displayed during and after the time the client and server systems are terminating communications. Client focus ads or server ads continue to be displayed on the client computer after termination of the communication session with the server until the user closes the focus ad or server ad screen. During the communications sessions when the client and server systems communicate to perform other functions such as user registration/subscription, system configuration, account maintenance functions, etc. the server system displays server ads. Server ads can be provided by subscribers and/or third party advertisers. Server ads are associated with a server system ad control file and ad display program (essentially identical to that of client ads).

Optional Services

Change of Address: It is common for issuers of business cards to change one or more items of contact information such as, for example, phone number, title, address, etc. When contact information changes it is desirable for both the issuer and prior recipients of the issuers business card be informed of the new contact information. Notifying prior recipients of changed contact information can be a time consuming task for the card issuer. It is especially difficult given the fact that most issuers of business cards rarely keep track of every person to whom they have given their business card. And it is nearly impossible for an issuer to know of recipients of his/her business card who have received the card from a source other than the issuer (i.e. a business associate "passes on" the business card of the issuer). Accordingly, the present invention provides for the "forwarding" of changed contact information.

When a subscriber's contact information or advertisements change, the present invention will automatically forward the updated information to users who communicate with the server system in the future as well as those who have previously down loaded the subscriber's information. A subscriber submits his/her updated contact and/or advertising information to the server system or, if the subscriber is also a user, then the client program automatically passes the changed information to the server system the next time the client computer of the subscribing user communicates with the server system. The server system maintains a "net change" image of the database of all of the contact information of all of the subscribers who's subscriptions are current (i.e. active). Each time a subscriber makes changes to their contact or advertising information stored on the server system the server system records the changes.

The server system maintains a contact list, herein referred to as a "UCL SUMMARY FILE" for each user of the present invention. The UCL summary file maintains a record of every unique UCL for which the user has down-loaded contact and advertising information to their client program. The server system also maintains a "UUID SUMMARY FILE" for each subscriber which maintains a record of every UUID of every user who has received the subscriber's contact and/or advertising information. The UUID summary file helps the server system to identify those previous recipients of a subscriber's information who should receive the subscriber's updated information. The server system compares the contents of the user's UCL summary file to the net-change image of the database stored on the server system and flags (i.e. identifies) those UCL's in the user's UCL summary file representing those subscriber files which contain changed or new contact data or advertisements since the last time the user's client program communicated with the server system. Those contact files and corresponding advertisements that contain changed or new data are down loaded to the user's client computer during the current or subsequent communication session(s) between the client computer and the server system, thereby providing automatic updating of the contact information and advertisements for the contacts stored on the users client system.

Supplemental Contact Information: It is desirable for a recipient of business cards to associate additional information or "notes" with a particular business card. For instance, a user might want to make notes relative to a conversation he/she had with the subscriber. Accordingly the present invention provides for the attachment of notes or supplemental information to contact records. When the user is in the process of entering UCL's into the client program the client program provides the user with an option to enter supplemental information about the subscriber as illustrated in FIG. 11-B. The client program stores this supplemental information (typically in the form of notes) in a temporary file identified by the UCL. Once the client program has communicated with the server system and the server system has down loaded the subscriber's contact information to the client program, the client program will append the contact information with the supplemental information prior to storing the contact information and supplemental information in the user's CMS/PIM.

Voice Activated Data Retrieval: It is advantageous for a user to be capable of retrieving contact information even when they do not have access to their client computer. Accordingly, the present invention provides for retrieval of contact information via telephone. The server system is coupled to a voice synthesis telephony system (as known in the art). The telephony system converts textual data into voice data for transmission via telephone. The user makes a telephone connection to the server system and enters his/her UCL and password via the telephone key pad, voice, or other means.

The server system will then prompt the user to enter (via the telephone key pad) or to speak the name of a subscriber, the subscriber's company name, or other such distinguishing information as to allow the server system to locate the specific contact information in the user's contact database. The server system will then execute one of a multiplicity of commands such as, for example, convert the contact information to voice and "speak" the information back to the user/subscriber or download the specified data to the user's specified client computer, etc.

Web Tracker: With a large personal contact database it is common for a user to search other sources (the Internet, web, phone book, etc.) for products or services which could be provided by someone the user already knows (i.e. a current contact). The user may simply forget (or did not know) that he/she has a current contact who can provide the product or service for which they are currently searching. Accordingly, it is advantageous for a subscriber and for a user that a user be made aware that his/her own contact database contains a contact(s) who provides a competitive or complementary product or service to that product or service represented by the web site or advertisement the user is currently viewing. For example, a plumber who is a subscriber would want to notify a user who is viewing a bathroom fixtures web site that he also provides bathroom fixtures as well as installation and design services. A home mortgage broker would want to notify a user of his/her products and services when the user visits certain competitor's web sites or the web sites of real estate firms. Accordingly, the present invention provides for such capability.

The subscriber submits to the server system for storage on the server system, a file (web tracker file) containing the domain names or web addresses for specific competitors or providers of complimentary products or services. The user's web browser will pass a copy of the web domain name currently being viewed to client program. The client program will compare the domain name to entries in the web-tracker file. If a match(s) is made the client program will 1. display the banner or spot ad(s) contained in the client ad file(s) which correspond to the UCL's of the contacts who provide the competitive/complementary service and 2. notify the user via a message displayed on the screen of the client computer. The message displayed will, in some manner, inform the user that a current contact exists (on the client computer) who provides a complementary/competitive product or service. The client program provides a means for the user to access additional information about the contact. If the user requests additional information (i.e. by clicking on or otherwise selecting the banner or spot ad or displayed message), the client program will display the focus ad(s) of the contact(s) who provide the competitive/complementary service or product(s). Display of a focus ad further provides additional means for contacting the subscriber such as, for example, visiting the contact's web site, or contacting the contact via telephone, email, etc.

Key Word Search: Additionally, the client program provides a facility to search the contact database of the client computer based on key words which are entered into the search field of a search engine on the web. For example, if a user is searching for "bathtubs" and enters the key word "bathtub" or "bathroom fixtures" into a search engine, the client computer will conduct the same search against the contact database on the client computer. If a match(s) is found the client program will notify the user in the same manner as described above in the "WEB-TRACKER" section.

Contact-Based News Tracker Service: It is common for business people to stay abreast of news-worthy events relating to people and companies with whom they conduct business.

With knowledge of news worthy events relating to their business contacts, users/subscribers are thereby more effective business partners, negotiators, competitors, sales people, etc. when conducting business with their contacts. It is common, therefor, for business people (particularly sales people) to search the Web, newspapers, or other news sources for news articles about the people and companies with whom they have business relationships. Business people also often have a need to follow news relating to a certain industry. Business people often don't have the time, take the time, or remember to "surf" the web for news about a contact, company, or industry. Accordingly, the present invention provides the capability to automatically schedule, collect and deliver to the user's/subscriber's client computer news information relating to the user's/subscriber's contacts and/or particular companies and/or industries. The user establishes a "news-tracker list" (i.e. a list of companies, people, or industries about whom the subscriber/user would like to receive news information). The subscriber/user identifies the individual companies, people, and industries which comprise the news-tracker list to the client program by one of a plurality of identifiers such as, for example, the company's stock trading symbol, company name, or corporate UCL (a corporate UCL is a UCL assigned to a company, not an individual person). For purposes of tracking news related to an individual the individual's UCL or name is used and for industry news the user identifies one or more SIC (Standard Industrial Classification) codes to the client program. The client program provides for the development and maintenance/editing of the news-tracker list. The client program stores the news-tracker list in a news tracker file. A search facility is provided for automatic identification of the corporate UCL or stock trading symbol (if available) and SIC codes. The client computer passes the news-tracker file to the server system once the client program has established communications with the server system. The server system stores the news tracker file and gathers news content via the remote network (i.e. the web/Internet) and/or direct communications links with news content providers such as, for example, Reuters and PR Newswire and local news content providers. "Local", in terms of news content typically means local to the card issuer (subscriber). The news content is then passed to the client program during the current or subsequent communications sessions. The representative embodiment of the present invention provides for delivery of news items/events, including general, national, global and local news events and specifically those related to the subscriber's/user's contacts whom the subscriber/user has identified to the news-tracker list.

Calendar Based News Tracker Service: PIM's/CMS's typically have an electronic scheduling or calendar function or integrate with such technology to allow the user to easily enter, edit, and share an electronic version of their calendar activities. It is advantageous for both subscribers and users to have knowledge of news events involving people and/or companies they will be meeting with or conducting business with in the near future. With knowledge of news worthy events relating to their business contacts, users/subscribers are thereby more effective business partners, negotiators, competitors, sales people, etc. when they are "face-to-face" with their contact. It is common, therefor, for business people (particularly sales people) to search the Web and other new sources for news articles about the people and companies with whom they will be meeting in the near future. Business people often don't have the time, take the time, or remember to "surf" the web for news about a contact prior to a calendar event (meeting). Accordingly, the present invention provides the capability to automatically schedule, collect and deliver to the user's/subscriber's client computer news information relating to the user's/subscriber's contacts with whom he/she will be meeting in the near future. The present invention contains an interface to the scheduling/calendar function(s) of PIM's/CMS's. The client program interfaces to the user's/subscriber's calendar. When making calendar entries, the subscriber/user preferably enters the UCL of the contacts he/she will be meeting with. If the user/subscriber does not know the UCL of the contact, the client program will record the first and last name and company name of the contact. The client program stores the UCL or first, last and company name information along with the event date and time in a calendar event file on the client computer. The server system has access to several news content services such as, for example, PR Newswire and Reuters. The next time the client program establishes communication with the server system the client program will pass the UCL (if available) to the server system and the server system will search the various news content services for news topics related to the company associated with the UCL. If the UCL is not available, the server system will utilize the company name obtained from the calendar system to direct the news search. If relevant news content is located, the server system passes the content to the client program during the current or subsequent communication session. The server system continues to collect and down load news events to the client computer (on a periodic basis defined by the user/subscriber) until an "end-news-collection" event occurs. An end-news-collection event may be, for example, the expiration of the calendar event (i.e. the date and time for the meeting has passed), or the event may be a command from the user, or the passage of a preset period of time, etc. The user/subscriber defines to the client program the number of days prior to the calendar event that the system should begin collecting news events and the number of days post event that the client program should purge or overwrite old news content. Should the calendar event be canceled or rescheduled, the client program will adjust the dates for commencement of news content collection, termination of news content collection, and purging of news content accordingly.

Personal Address Book/Electronic Registry: The present invention lends itself to the management of personal contact and personal "advertising" information as well as business contact and advertisement information management. Similar to a bridal registry, the "subscriber" will complete subscription information and store the information in a file(s) identified by a UCL on the server system. Examples of such personal subscription information are illustrated in FIG. 2-D "Personal Address Book". In the representative embodiment of the present invention, the subscriber prints/encodes their UCL on any of a multiplicity of social communication media such as, for example, a birthday card, Christmas card, post card, letter, email, etc. The UCL may also be communicated to the user (recipient) verbally or by any other communications means. The recipient (i.e. user) of the social communication media enters (manually or automatically) the UCL into their client computer (i.e. electronic address book). The user's client computer establishes communication with the server system, accesses the subscriber's file (identified by their UCL) and downloads the personal contact information to the client computer following essentially the same process as that of a subscriber and a user storing and downloading business contact information and news and advertising.

Language Translation: It is increasingly common for business people to conduct business with contacts who speak a different first language. Consequently, it is common for the card issuer to print, carry, and distribute multiple business cards printed in multiple languages. For example, a Japanese business person will carry a quantity of business cards printed in Japanese and another set of business cards printed in English. When conducting business with an American contact the Japanese business person will provide his contact with a business card printed in English. The representative embodiment of the present invention provides for automatic translation of business card information and advertising (and news content) from the subscriber's primary/preferred language into the preferred language of the user (i.e. recipient) of the client program. If the subscriber wishes to provide his/her business card information in a language(s) other than their preferred language, then when the subscriber subscribes to the server system they provide contact and advertising information in each desired language in addition to their preferred language. The server system stores the multiple language versions of the subscriber's contact and advertising information. The registered user has previously registered with the server system indicating the user's preferred language. When the server system accesses the subscriber's contact and advertising files to download information to the user, the server system will download the information in the preferred language of the user.

Contact Detail Authorization: It is desirable that an issuer of business cards (subscriber) be able to control the level of contact information detail which is received by a recipient (user). In one case an issuer may want a recipient to receive maximum business contact information. In another case the issuer may want the recipient to receive only limited contact information. Accordingly, the representative embodiment of the present invention provides for the subscriber (issuer of business cards) to control the level of information detail received by the user (receiver of issuer's business card). According to one embodiment of the present invention, the subscriber provides multiple, unique versions of his/her "contact detail" information or "personal address book" information to the server system. Accordingly, upon completion of the subscription process and/or subsequent additions or deletions to the contact detail information or personal address book the server system assigns a unique UCL for each unique version of the contact detail or personal address book information. If the subscriber desires 2 distinct levels of contact detail available for delivery to receivers then the subscriber provides 2 unique versions of his/her contact information, each containing the desired information and each identified by a unique UCL which is assigned by the server system. The subscriber then encodes business cards with one of the unique UCL's according to the contact information he/she desires to transfer to the receiver.

An alternate embodiment of the present invention provides for an alternate method for the subscriber to control the level of detail received by a user of the present invention. In the alternate embodiment, the subscriber associates contact detail information with one of a plurality of "levels" during the subscription process. For example, the subscriber may assign "name, address, phone number, company name, title", etc. to "level 1 detail" and "email address, direct phone number, cell phone number", etc. to "level 2 detail". The subscriber establishes with the server system a "default detail level" of "1" to his/her contact detail information. The subscriber is issued only one UCL by the server system. When a user downloads the subscriber's associated business card information from the server system to their client computer, the server system downloads to the client computer only the subscriber's contact detail associated with the default detail level (in this example, level "1") and also updates the subscriber's UUID summary file with an entry indicating, for example, that "user UUID X has downloaded the subscriber's level 1 contact detail information". The next time the subscriber's client computer establishes communication with the server system the server system down loads the contents of the subscriber's UUID summary file to the subscriber's client computer, stores the UUID summary file information in a UUID authorization file on the client computer and displays the contents to the subscriber. The subscriber is then presented with a menu, which allows the subscriber to alter the detail level associate with each UUID. For example, the client program might present the subscriber with a list of 4 UUID's. Upon review, the subscriber increases the detail level assigned UUID number 3 to "level 2" and leaves UUIDs 1, 2, and 4 at the default level of "level 1". The client program transmits the updated UUID authorization list back to the server system during the current or subsequent communication sessions. The server system then automatically identifies the updated authorization level (now level 2) (see the Optional Services section titled "change of address" above for further detail on how changed information is identified) associated with UUID 3 and downloads the additional detail-level 2 contact information of the subscriber to the user identified by UUID 3 the next time the user (UUID 3) communicates with the server system.

BRIEF DESCRIPTION OF THE DRAWINGS

FIG. 1-A. Illustrates a schematic diagram of a client computer of the present invention.

FIG. 1-B Illustrates a schematic diagram of the server system of the present Invention.

FIG. 1-C illustrates a system diagram of the present invention.

FIG. 1-D illustrates an alternate embodiment of a client computer of the present invention in the form of a portable computer.

FIG. 1-E illustrates another alternative embodiment of a client computer in the form of a hand held computer.

FIG. 2-A is illustrative of a file system/data structure of the client computer.

FIG. 2-B is illustrative of a file system/data structure of the server system.

FIG. 2-C is a block diagram representation of representative data communicated between the client computer and the server system.

FIG. 2-D schematically illustrates information contained in the subscriber account detail file.

FIG. 4 is a block diagram illustrating the subscriber subscription process.

FIG. 10 is a block diagram which depicts the display/viewing of advertisements on the client computer and a representative user action.

FIG. 11-A illustrates an example client computer "background-mode" screen showing example news and advertising.

FIG. 11-B is an example of a client computer "foreground-mode" screen illustrating the entry of UCLs and associated notes and display of representative advertising.

FIG. 11-C illustrates an example client compute screen depicting an example focus ad as well as example banner and spot advertisements.

DETAILED DESCRIPTION

Figure 3:
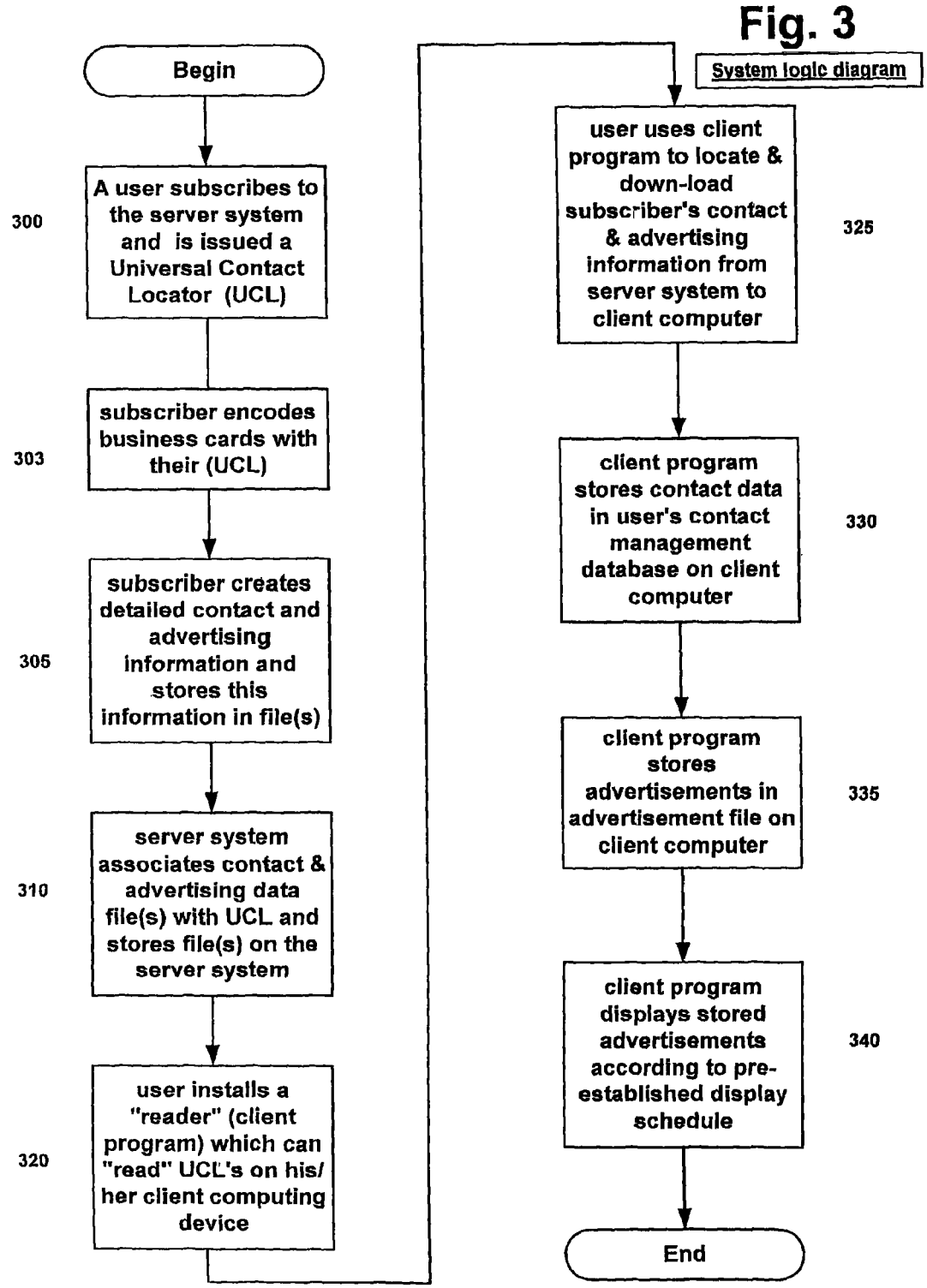
FIG. 3 is a system level logic diagram.

System Summary:

The user enters the UCL(s) into the client system via automated or manual methods. The client computer then establishes communication with the server system and passes one or multiple UCL's to the server system. The server system retrieves the contact information and advertisements and other data associated with the UCL(s) as well as changed data from existing contacts and updates to the client program and transfers the data (i.e. inbound data) to the client system. The client system and server system update their respective statistics, configuration, and log files before terminating the communication session. The client program stores the received inbound information (i.e. contact, news, advertisement, configuration, etc.) in the designated storage files (i.e. contact information transferred to and stored in the PIM/CMS, the advertisements stored in the advertising file(s), etc.). Updates are also made to the appropriate statistics, log, configuration, etc. files. The news and advertising player then displays news and advertising information on the display of the client computer according to the schedule and other parameters of the news and ad control profiles.

System Architecture: In a representative embodiment of the present invention, a "mostly disconnected", client-server architecture is provided, though not required, for the delivery of business and personal contact information and advertising. The representative embodiment is "mostly disconnected" because the local or "client" computer is only connected to the remote or "server" computer for a brief period of time whenever the user of the local or client computer connects to the public network (i.e. the Internet) either specifically to communicate with the server system or to perform other functions. Such "other functions" might include, for example, shopping for goods, trading stocks, or reading an on-line version of the Wall Street Journal on the World-Wide-Web (hereinafter referred to as "the web"). The initiation of the communication session with the remote network (i.e. the Internet) may be caused by manual input from the user or the communications session may be initiated automatically by the client program based upon certain criteria such as, for example, a period of I/O inactivity or idleness (similar to a "screen saver" as well known in the art) or other parameters such that the user is not required to manually initiate the communication process.

The Client Computer: The user of the present invention uses a client computer to run the client program and to communicate with the server system. In the representative embodiment, the client computer is remotely located with respect to the server system. Typically, there are many users, each with a client computer executing the client program and capable of communicating simultaneously with the server system. Herein the term "client" computer shall be used to represent any local computing device such as a hand-held "palm top" computer, laptop computer, desktop computer, terminal, PDA (Personal Digital Assistant), PIM (Personal Information Manager), Network computer, wireless communicator (such as a cellular or satellite telephone), etc. which is capable of communicating with a remote or server computer via the remote network. The client computer may also, customarily (as well known in the art), contain an output device such as a CRT or LCD screen or plasma display, a manual data entry device such as a keyboard, keypad, touch screen, voice recognition system, pen stylus, or other such manual input devices as are commonly know in the art. The client computer may also be equipped with an automated input device such as a bar code reader, magnetic stripe reader, "smart card" reader, MICR (Magnetic Ink Character Recognition) reader, OCR (Optical Character Recognition) reader, or other such automated data input devices as are well known in the art. It is likely that multiple client computers will be communicating with the server system simultaneously.

In the representative embodiment of the present invention, a client computer is used by each user and runs a client program. The client computer has a secondary memory device, such as, for example, a hard disk drive or non-volatile memory. The client program of the present invention is stored on the secondary memory device of the client computer and is executed by the client computer's processor. It will be appreciated by one with skill in the art that the client program might be installed on the client computer from a number of sources such as, for example, downloaded over the Internet from a server, bundled with software provided by a third party software manufacturer (such as a Web browser provided by a Web browser manufacturer), manually installed from a media such as CD ROM, etc. It will be appreciated that the client program will function in substantially the same manner regardless of the installation source or method. The representative embodiment of the present invention provides for down-loading of the client program via the Internet for installation on the client computer.

The client computer has the capability to connect to the remote network. The client computer may connect to the remote/public network via a variety of methods such as a phone modem, wireless (cellular, satellite, microwave, infrared, radio, etc.) network, Local Area Network (LAN), Wide Area Network (WAN), or any such means as necessary to communicate to a server computer connected directly or indirectly to the remote network (i.e. the Internet). The term "wireless" as used in an embodiment of the present invention is defined by the capability of the system to transmit digital information from one device to another without use of cable.

It will be apparent to one with skill in the art that the operating system for the client computer could be either a single user operating system such as Microsoft DOS or Microsoft Windows or it could be a multi-tasking/multi-threaded operating system such as Unix or Microsoft Windows NT.

It will be appreciated by one with skill in the art that although the terms "client" and "server" are used herein, the architecture of the present invention is not limited to what is known in the art as a client/server network.

The Network: As used herein the term "remote network" is used to describe any public network such as the Internet or World Wide Web or any public or private network as may be developed in the future which provides a similar service as the present Internet.

The Server System: The client program periodically communicates with a server system. Used herein the term "server" computer is used to describe any remotely located (with respect to the client computer) computing device that stores a database of business and personal contact information and news items and advertisements to be accessed by such client computer and such contact information and advertisements to be downloaded to one of a multiplicity of client computers.

In the representative embodiment of the present invention the server system is comprised of a number of application servers (running application software programs) connected to a number of database servers (running database management software). Each server computer consists of one or multiple high speed CPU's (Central Processing Unit(s), primary memory (i.e. RAM) and secondary storage device(s) (i.e. hard disk drives). In the representative embodiment of the present invention, the server computer(s) run one of a variety of multi-tasking, multi-threaded operating systems such as, for example, Microsoft Windows NT, Unix, etc. Together the application software, the database management software, the associated server computing hardware and operating software, and the communications hardware and software, etc. comprise the server system. The application programs, operating system and the database management programs may all run on the same computing device as in a traditional "main frame" type of configuration or several, individual yet interconnected computing devices as in a traditional "multi-tier client-server" configuration as well know in the art. The server system is coupled to the remote network (such as the Internet). The server system executes a (or multiple depending on the server system configuration) server program(s). The server system and the client program have communications facilities to allow client computers to connect to and communicate with the server program(s) such that the server program(s) can communicate with and exchange information with a multiplicity of client programs. It will be appreciated by one with skill in the art that the operating system for the server system advantageously is a multitasking/multi-threaded operating system, but could be a single tasking/single threaded operating system.

Causing Connection to the Server System: In the present invention, the client program will cause the client computer to establish an electronic communications session with the server system as a result of one of a multiplicity of conditions. It will be apparent to one with skill in the art that there are many ways to cause the communication connection between the client computer and the server system such as; by the user actively selecting a command from a menu such as "update contacts", by the client program causing a web browser resident on the client computer to spawn a "background" process while simultaneously performing other tasks, by the completion of the entry of certain data (such as the UCL entered either manually or automatically), by the passage of time, or by numerous other conditions. For example, in one embodiment, the user establishes a connection to the Internet for the purpose of checking email. Once the connection has been made to the Internet, the client program spawns an additional process (as well known in the art) and causes the web browser to establish a second connection with the server system storing card issuer (subscriber) contact information and advertisements. In another embodiment, the user scans the UCL encoded on a business card in machine-readable format into a palmtop computer. A control character at the end of the UCL causes the client program on the palmtop computer to cause the palm top's modem to immediately make a wireless connection to the Internet and pass a preset URL to the palm top's web browser for connection to the server system. In yet another embodiment, the client program monitors Input/Output activity in much the same manner as a "screen saver" (as well known in the art) might and waits for a period of inactivity. After a preset period of time has passed without the requisite I/O activity (keyboard activity, mouse activity, printer activity, network activity, etc.), the client program causes the client computer to establish a communications session with the remote server system.

Typically, the client computer is connected either directly via a hardware Network Interface Card or via dial up phone or cable modem to a private local area network (LAN) or wide area network (WAN) which has at least one server connected to the remote network (i.e. World Wide Web, Internet, etc.). Often, the private network and server connection to the remote network are provided by an Internet Service Provider or "ISP" and the user "dials" into the ISP's network via phone modem. The client computer also runs a program called a "web browser". This web browser is used to interpret Universal Resource Locators (as well know in the art) which represent the Internet or IP addresses of other computers and resources connected to the web. The browser navigates the web and facilitates communication with devices attached to the web and interprets web pages into a form readable on the client computer.

In the representative embodiment, a user (recipient of business cards) also provides certain information to the server system relative to the manufacturer and version of contact management software (CMS) (i.e. ACT version 5.0, Gold Mine version 4.1, Outlook 97, etc.) in which the user would like his/her contact management data stored. It will be apparent to one with skill in the art that the client program might also automatically determine the manufacturer and version of the contact management system (CMS/PIM) resident on the client computer and automatically make the necessary adjustments to communicate with the CMS/PIM.

The client program is made up of a multiplicity of programs that perform certain functions. These programs/functions include, but are not limited to, for example; an "INSTALLATION AGENT" to install and configure the client program(s), a "COMMUNICATION MANAGER" to manage the processes of connection and communication between the client computer and the server system, a "NEWS AND ADVERTISING PLAYER" which manages the display of news items and advertisements, a "SUBSCRIPTION MANAGER" which manages the processes and data associated with subscribing and registering with the server system. The client program also contains an "EVENT MANAGER" program which records and transfers (to and from the server system) all events (including the viewing of ads, attempts to alter the client program, etc.) taking place on the client computer, a "UCL MANAGER" or "reader" program to read incoming UCL's from encoded business cards, forward pending contact information and collect inbound contact information. The client program also contains a "PIM/CMS INTERFACE" which manages the transfer of information between the client program and the user's PIM/CMS program.

When submitting an ad to the server system the subscriber completes an "AD CONTROL PROFILE" which is then associated with the ad(s). The ad control profile contains parameters which describe the ad type, actions, and display schedule. The ad types include for example "banner" ads which are typically displayed at either the top or bottom of the client screen in a narrow window. Banner ads can be stationary or animated (such as scrolling in a "ticker tape" fashion). Spot ads are displayed at various locations on the client screen and are typically larger than banner ads. Spot ads can be stationary or animated. News and advertisements are typically divided into primary or "header" information and secondary or "body" information similar to a traditional newspaper article or magazine advertisement. The header portion of news items and advertisements are typically displayed first. The user can then initiate certain commands or functions which will cause the client program (i.e. the news and ad player) to perform certain actions. "Actions" determine what actions or functions the client program (i.e. the news and ad player) is to perform should the ad be selected. For example, the user clicking on a spot or banner ad (typically the "headline" or "header" portion of the news item or advertisement) causes the display of a "focus ad" which displays additional information (i.e. the "body" information of the associated spot or banner ad) in a larger window. The user can then initiate further action(s) (if desired) to communicate with the issuer (or an associate of the issuer) of the news item or advertisement. Such further actions might include, for example, connecting to the advertisers web site, or sending an email to the local representative of the advertiser, etc. The AD CONTROL PROFILE contains an AD DISPLAY SCHEDULE which controls when the ad is eligible to be down loaded from the server system to the client program, when the ad is eligible to be deleted (or over written) from the client computer, how often the ad is to be displayed to the user, etc.

System Components:

FIG. 1-C illustrates an exemplary system configuration of the present invention. The representative embodiment is illustrative of an Internet or World-Wide-Web based business card system. The representative embodiment of the present invention provides for a computer based system that allows business card issuers to encode their business cards FIG. 15 with a unique identifier 1508 and store contact information FIG. 2-D and advertising information FIGS. 2-D & 12 in a file identified by the unique identifier 1508 on a remote server system 130 and transfer the contact and ad information to a client computer 100 and display the contact information FIG. 2-D and advertising information FIGS. 2-D & 12 on the display device 102 of the client computer 100. A receiver (herein often referred to as a "user") of the issuer's (herein often referred to as a "subscriber") encoded business card FIG. 15 uses a client computer 100 running a client program 200 to access the subscriber's stored contact and advertising information FIG. 2-D stored on the remote server system 130 and down load the subscriber's contact information 208.2.2 and advertising information 208.2.10 to his/her client computer 100 and store the down loaded information on the primary 110 and secondary 104 storage devices of the client computer 100. It will be appreciated that although the representative embodiment of the present invention refers to the utilization of business cards FIG. 15, the present invention is applicable to other social and personal communications media such as greeting cards, post cards, written and electronic mail, etc.

Client Computer: Client computer 100 is typically a personal computer as illustrated in FIG. 1-A, but may also be a portable computer such as a laptop or notebook computer as illustrated in FIG. 1-D or a wireless communicator or hand held computer such as a cellular phone or PDA (i.e. 3-com's Palm Pilot) as indicated in FIG. 1-E. It is common for users of client computers 100 (particularly portable or hand held computing devices as illustrated in FIGS. 1-D & 1-E) to maintain information on a multiplicity of client computers. It is often desirable for a single user of such multiple client computers 100 to synchronize or replicate the information contained on each of the multiple client computers such that all of the single user's multiple client computers contain the same information. Accordingly the present invention provides for utilization of client computers 100 and supplemental client computer(s) 115. Although the representative embodiment of the present invention discusses the use of client computer(s), it will be appreciated by one with skill in the art that a supplemental client computer 115 may also be utilized to send and receive information directly to and from the server system. Alternatively, supplemental client computer 115 may send/receive information indirectly to/from the server system 130 via the client computer 100 as illustrated in FIG. 1-C.

As illustrated in FIG. 1-A, client computer 100 includes a central processing unit (CPU) 108 to execute programs (including the client program) and manage the operation of the client computer 100. Primary memory 110 (i.e. high speed random access memory) is coupled to the CPU 108 and is used for temporary storage of programs and data, and a secondary memory device 104 (i.e. disk or optical storage) coupled to the CPU 108 is used for non-volatile storage of programs and data. A removable media storage 106 (i.e. floppy disk or CD ROM or optical disk) is coupled to the central processing unit 108 for purposes of loading computer programs, including the client program, and data into the client computer 100 and for non-volatile storage of computer programs and data. Output device 102 (i.e. CRT or LCD panel) is also coupled to the CPU 108 and provides a user interface and manual input devices 113, 114 and 116 such as audio input microphone, key board and mouse and automated input device(s) 117 and/or 118 such as bar code or magnetic stripe reader(s) coupled to the CPU 108 provide means for a user of the client computer 100 to input commands, data, etc. Other input devices such as, for example, touch screen, voice recognition 113, Optical Character Recognition, Smart Card reader, etc. are examples of alternative input devices for alternative embodiments of the present invention. A communications interface(s) 112 such as a phone modem or network interface (NIC) card is coupled to the CPU and provides a means for the client computer 100 to communicate with the server system 130 and other computers via the remote network 120.

Although FIG. 1-C illustrates only 1 client computer 100 communicating with the server system 130 it is understood that the present invention is intended to support a plurality of client computers 100 (of a multiplicity of configurations) communicating with the server system 130 simultaneously. It will be appreciated by one with skill in the art that the type of computing device which comprises the client computer 100 and the type of device which comprises communications interface 112 may be a variety of different devices and configurations and technologies and may be physically packaged as one or many distinct entities. For example, as illustrated in FIG. 1-D the client computer 100 may consist of a laptop or notebook computer 113 (as well known in the art) with a built-in, wireless modem which communicates to the remote network 120 via a supplemental digital or analog cellular or satellite communications network. Or, as illustrated in FIG. 1-E, the client computer 100 might consist of a hand-held Personal Digital Assistant (PDA) 103 or wireless telephone and communicate via a built-in cellular or satellite modem 112 to the remote network 120 via a satellite-based or cellular or radio based communication system. The spirit of the representative embodiment of the present invention is to provide for a client computer 100 that is capable of providing adequate processing power and storage for programs and data and which will communicate with a remote server system 130 via a remote network 120. As illustrated in FIG. 1-E, it is desirable and advantageous that the client computer 100 be highly mobile (i.e. battery powered, hand-held, etc.) and be capable of wireless communication with the server system 130.

The communications interface 112 might, alternatively, be a network interface card (NIC) which communicates with a Local Area Network (LAN) or Wide Area Network (WAN), or the like, communicating via TCP/IP or X.25 or other such network protocols, which in turn communicates with or is coupled to the remote network 120.

For purposes of clarity, client computers 100 belonging to subscribers are often referred to herein as "subscriber client" computers 100 and client computers 100 belonging to registered users are often referred to as "user client" computers 100.

The Remote Network: The client computer 100 is located remotely from the server system 130 and communicates periodically with the server system 130 via the remote network 120. In the representative embodiment of the present invention the remote network 120 is the Internet or World Wide Web (herein referred to as "the web"), but it will be appreciated that the network may be any such communications network, either public or private or a combination, which provides computer-to-computer communications between a plurality of client computers 100 and the server system 130. While FIG. 1-C illustrates one client computer 100 communicating with the server system 130, it is understood that the present invention provides for many client computers (in any multitude of configurations) to communicate simultaneously with the server system. A communication session is established between the client computer and the server system 130 by causing the client computer communications interface 112 to establish an electronic dialog with the server system's communications interface 132 via the remote network 120 (i.e. the world wide web or the Internet).

The Server System: The server system 130 is coupled to one or more remote networks 120 via one or more communications interface devices 132 and one or more communications servers 136. The server system 130 receives, stores, and transmits the contact information FIG. 2-D and advertisements FIG. 11-C of subscribers who have subscribed to the server system 130. The server system 130 also receives, stores and transmits other information to and from client computers such as ad viewer statistics, user statistics, log files, ad control programs, etc. as described herein. The server system 130 also receives news information 264.4 from news information providers 290 and advertising information 264.4 from advertisers 292 either via direct communications link or via the remote network 120.

The representative embodiment of the present invention provides for a multi-tier, client server architecture for the server system 130. As such, server system 130 is comprised of a plurality of high performance servers 134-137 coupled together via a high-speed network 138. The representative embodiment of the present invention provides for a plurality of application servers, a plurality of database servers, a plurality of communications servers and a plurality of subscription and registration servers. It will be appreciated by one with skill in the art, however, that Server system 130 could, alternatively, be configured in many different configurations suitable to varying technologies. For example, an alternative configuration might consist of one or multiple large server(s) performing multiple functions as in a traditional "main frame" configuration. Alternatively, the individual servers 134-137 of server system 130 could perform multiple functions such as application server and subscription and registration server in one physical entity. It is also understood that the devices which comprise server system 130 may be located in geographically dispersed locations or may all reside in one physical location.

Server Computers: The representative embodiment of the present invention provides for one or more SUBSCRIPTION & REGISTRATION SERVERS 137 1-y which accommodate first time users in registering or subscribing to (as described herein) the server system 130. DATABASE SERVERS 135 1-n support (i.e. execute programs and store data, accept inputs and produce outputs, etc.) the database management system 264 of the server system 130. APPLICATION SERVERS 134 1-z execute and store the application programs of the server system 130. Communications servers 136 1-x provide communications connectivity between the server system 130 and client computers 100 via the remote network 120.

The individual servers 134-137 of server system 130 each, typically, contain the following components: one or more high speed CPU's, primary memory (i.e. high speed RAM), one or more secondary storage devices (i.e. high capacity hard disk drive(s)), removable media drives (such as CD ROM or tape) for loading and storage of programs and data, and one or more network interface card(s) or other such means to interface to the local high speed network 138. Additionally, connected to the local high-speed network 138, are a plurality of network devices such as high capacity, high-speed secondary storage devices 144 (such as hard disk drives), backup/archive devices 140 and 141 such as tape and/or optical disk drives for high capacity, high-speed loading of programs and data as well as archival and backup of programs and data. One or more consoles 145 (or other such user interface devices such as a CRT), and keyboard 146 and mouse 147 are also provided for operator control of the server system. The local network 138 is a high-speed, high-capacity Ethernet or other such-high speed, high-capacity network as to provide high-speed, high bandwidth computer-to-computer communications.

Basic System Logic:

For purposes of clarity the movement of information (programs, files, data, etc.) between the client computers 100 and the server system 130 can be described from the perspective of the client computer. Information which is transferred (often referred herein as "uploaded") from the client computer to the server system is often referred to herein as "outbound" information (programs, files, data, or other such digital information). Information which is transferred from the server system to the client computer (often referred to herein as "downloaded") is often referred to herein as "inbound" information.

For purposes of clarity, client computers belonging to subscribers are often referred to herein as "subscriber client computers" and client computers belonging to registered users are often referred to as "user client computers".

In the representative embodiment of the present invention it is desired, though not required, that some information such as, for example, the subscriber account header 264.6.2, the subscriber password 264.6.4 and the registration information 264.6.6 is established directly on the server system 130 and is not uploaded from the client computer 100 and is therefor identified in FIG. 2-C by an asterisk '*'. Third party news and advertising information is transferred directly to the server system 130 from $3^{rd}$ party news and advertising content providers 290 & 292.

FIG. 3 illustrates the basic processes of the representative embodiment of the present invention. Step 300: a user subscribes to server system 130 and thus becomes a subscriber and is issued a Universal Contact Locator (UCL) 1508. Step 303: a subscriber to server system 130 encodes business cards FIG. 15 with their Universal Contact Locator (UCL) 1508. Step 305 the subscriber creates subscriber account detail information 208.2 & FIG. 2-D. Subscriber account detail 208.2 and FIG. 2-D consists of one or more files (or other such data structures as are well known in the art) which include; Contact detail 208.2.2, Web Tracker 208.2.6, subscriber news and advertising 208.2.10, client computer configuration 208.2.12, personal address book 208.2.14 and other files. Subscriber account detail and related files are discussed in greater detail below in the section titled "establishing a subscriber account". The subscriber account detail 208.2 and FIG. 2-D is then stored in one or more "subscription and registration files" 264.6 on the server system 130. Subscriber account detail files 208.2 and the subscriber event log file(s) and other files constitute the "subscriber's outbound information" (FIG. 2-C). Step 310: The server system 130 associates the subscriber account detail files 208.2 & FIG. 2-D created in step 305 with the subscriber's UCL 1508 and stores the files on the server system 130.

Step 320: A first-time user registers with server system 130 and thus becomes a registered user (herein referred to as simply a "user") and is assigned a Universal User Identifier (UUID) as described below. The user installs a client program 200 on client computer 100. Typically (preferably) the client program 200 is down loaded from server system 130 via the remote network 120 and stored on secondary storage device 104 of client computer 100. Alternatively, the client program 200 might be mailed to the user via the US mail or other such means (or received along with other software provided by a third party) on removable media such as floppy disk or optical disk and installed on the client computer 100.

Installation of the client program 200 on the client computer 100 is typically accomplished using an installation agent or install program 202 (some times referred to herein as an "installation script") The installation agent is discussed in further detail below in the section titled "client program installation and configuration". Once the client program 200 is installed on the client computer 100 the user is able to utilize the reader function 212.2 of the client program 200 to "read" or accept UCL's 1508 as encoded on the received business card(s) 1502 or other business, personal or social communication media of a subscriber. The reader function 212.2 of the client program 200 reads the UCL 1508 and stores the UCL in a "pending contacts" file 212.4 on the user client computer 100 until such time as the user manually initiates or the client program 200 automatically initiates a communication session (either wire based or wireless) between the client computer 100 and the server system 130.

Once the communications session is established between the client computer 100 and server system 130 the client program 200 passes the user outbound information i.e. the contents of the pending contacts file 212.4 (i.e. a list of stored UCLs and supplemental information) to the server system 130. The server system then locates the subscriber outbound information SOI (i.e. contact records 208.2.2, news and advertisement records 208.2.10, web tracker records 208.2.6, etc.) of each subscriber, each subscriber's outbound information being identified by the subscriber's individual UCL 1508. The combination of one or more subscriber's outbound information SOI with third-party news and advertising 264.4, and updates associated with client programs, etc. constitute "user inbound information" UII. The server system 130 then downloads the user inbound information UII to the client computer 100 via the remote network 120 and stores the information temporarily in an "inbound spool" file 212.6 on the client computer 100 and terminates the communications session. The client program 200 then (steps 330 and 335) transfers the user inbound information UII to the appropriate storage files on the client computer. For example, the subscriber contact detail 208.2.2 & FIG. 2-D is transferred to the PIM/CMS 216 via the PIM/CMS interface 214, the subscriber advertising 208.2.10 & FIG. 2-D is transferred to an "advertisements" file 206.2, the inbound news items 208.2.10 are transferred to the "news items" file 206.6, etc. Each user inbound information UII record is stored with the associated UCL 1508 of the subscriber such that the information can be located by the user or the user client program by UCL. The "news and advertising player" 206 of the client program then displays (step 340) the news and advertisements stored in the news 206.6 and advertisement 206.2 files of the user client computer 100 according to the parameters of the ad control profile 206.4 and news control profile 206.8 of each news item or advertisement.

Establishing a Subscriber Account: FIG. 4

Account Header (Step 405): An issuer of business cards or other such business, social or personal communications media communicates with the server system 130 and stores subscriber outbound information SOI on the server system 130 for later transmission to users of user client computers 100.

Referring now to FIG. 4, the potential subscriber establishes communication with a Subscription & Registration Sever 137 for purposes of establishing a Subscriber Account. The subscription and registration manager program 252 of the server system application program(s) 250 presents the potential subscriber with a "Subscription and Registration" screen. The potential subscriber completes (step 405) the account header information 264.6.2 such as, for example, name, company name, address, billing method (credit card, company purchase order, etc.), billing address, phone number, email address, manufacturer and version number of the operating system of the client computer, etc. Account header information 264.6.2 fields which are optional are indicated as such. The server system 130 contains a plurality of directories and sub-directories, one of which may be titled, for example, the "Subscription and Registration Information" sub-directory 264.6. Once the subscriber has completed the subscriber account header information 264.6.2, the subscription and registration manager 252 assigns (step 410) a Unique alpha numeric Contact identifier (herein referred to as a Universal Contact Locator or UCL 1508) to the newly subscribed subscriber and creates (step 415) a "subscriber account" file in the "subscription and registration Information" sub-directory 264.6 on the database management system 264 of the server system 130. The subscriber's subscriber-account file is identified by the subscriber's UCL. The subscriber-account file will be used by the server system to locate information associated with the subscriber (i.e. the subscriber's outbound information SOI).

Password(s) (Step 420): The subscriber is required to establish a password 264.6.4 (step 420) and is routed to a "password creation" screen. The password 264.6.4 is required for the subscriber to perform certain access and maintenance functions such as, for example, updating of billing information, updating of advertisements or updating of his/her own subscriber outbound information SOI.

Configuration Header (Step 425):

The subscriber is also required to complete (step 425) header information (i.e. base information) for the "configuration" file 208.2.12. The configuration file 208.2.12 contains information to support proper delivery and installation of the subscriber client program 200 on the subscriber client computer 100 as well as the proper communication between the subscriber client program 200 and the server system 130. The configuration file 208.2.12 contains such information as, for example, the type of communication interface 112 on the subscriber client computer 100 (i.e. v.90 compatible 56K modem, cable modem, Ethernet network interface connection, etc.), phone dialing pattern for accessing an outside phone line(s) or service provider(s), etc. The configuration file 208.2.12 is then stored on both the server system 130 and the client computer 100 (when the client program 200 is installed on the client computer). The configuration header information is completed by the user to ensure that the proper version of the client program is delivered to the subscriber.

Subscription Detail Information: The subscriber is offered the choice of completing the subscriber account detail information 208.2 on-line (i.e. while the communication session between the client computer and the server system is active) or off-line. If on-line (completion of subscriber detail) is chosen then the subscriber completes the subscriber account detail 208.2 on-line. As noted above, the subscriber account detail 208.2 and FIG. 2-D consists of one or more files (or other such data structures as are well known in the art) which include; Contact detail 208.2.2, Web Tracker 208.2.6, subscriber news and advertising 208.2.10, configuration 208.2.12, personal address book 208.2.14 and other files. When on-line completion of the subscriber detail information 208.2 is complete the subscription and registration manager 252 attaches (step 427) the subscriber's UCL 1508 to the client program 200 and downloads the client program 200 (step 430) via the remote network 120 to the client computer 100.

If "off-line" (completion of subscriber detail) is chosen (as described below), then the subscription and registration manager 252 attaches the subscriber's UCL 1508 to the client program 200 and down-loads (that is to say "transfers") the client program 200 including the subscriber's own personal UCL 1508 to the client computer 100 and terminates the communication session.

Installing the Subscriber Client Program (Step 435):

The client program 200 must be installed on the client computer 100 and properly configured. The subscription & registration manager 252 attaches the subscriber's UCL 1508 (step 427) to the client program and the subscription and registration server 137 downloads the client program (step 430) to the client computer 100. It will be appreciated by one with skill in the art that it may be beneficial for the server system 130 to down load a client program 200 which is capable of operating on a variety of client computer operating systems 101 and of communicating with a wide variety of CMS (Contact Management System) systems 216 (i.e. Act, Gold Mine, Outlook, Palm Pilot, etc). Conversely, in the interest of efficiency, it may be beneficial for the subscriber to select (or the server system to automatically assign), while on line with the server system, a client program 200 which is optimized specifically for one or a subset of operating platforms 100 & 101 and is capable of communicating with just one or a subset of the possible CMS systems 216 available.

Referring now to FIG. 4, once the subscriber account header 264.6.2 (step 405) and configuration header (step 425) information is complete and the subscriber's UCL 1508 and password 264.6.4 are assigned (steps 410 and 420), the server system attaches the subscriber's UCL to the client program (step 427) and downloads, i.e. transfers, (step 430) the client program including the subscriber's own UCL 1508 to the subscriber's client computer 100.

It will be appreciated by one with skill in the art that there are a multitude of viable methods for installing and configuring the client program 200 on the client computer such as, for example, downloading the client program 200 over the remote network 120 and automatically installing the client program 200 on the client computer 100 using an installation and configuration agent 202 or manually installing the client program 200 from a floppy disk, CD ROM, or DVD, etc. with the assistance of an installation and configuration agent or wizard 202 (as well known in the art). An installation and configuration agent 202 might, for example, accompany the client program 200 which could automatically configure and install the client program 200 on the client computer 100. The representative embodiment of the present invention provides for the automatic delivery, installation and configuration of the client program 200 via remote network 120. An installation agent is but one example of how the client program delivery, installation and configuration might be accomplished.

The client program 200 includes a setup program/installation agent (or script) 202 which will determine if there is sufficient space on the storage device 104 of the client computer 100 in which to install the client program 200. When run, the setup program/installation agent 202 automatically creates the necessary directory(s), sub-directories, icon(s), etc. on the client computer 100. The installation agent typically automatically identifies client computer resources (such as drive and path names, modem configuration, etc.) and automatically installs the client program. Alternatively, the installation script may prompt the user for information to assist in the installation such as modem type and speed, phone dialing procedures (i.e. access to outside dial tone), directory paths, optional functions, etc. The installation agent then installs and stores the client program 200 and it's associated files and executable programs in the directory(s) and it's associated sub-directories. For example, the directory created by the installation agent/setup program might be labeled "Webbcard". The installation script/agent then creates a plurality of sub-directories (as are well know by one with skill in the art) such as, for example, a "Webbcard.bin" sub-directory for executable program(s) and associated DLL's, a "Webbcard.tmp" sub-directory for temporary files, etc. A "subscriber account detail" sub-directory 208.2 is also created which is described below. The installation and configuration agent 202 also creates other files necessary for the proper functioning of the client program. Other files are automatically created by the installation and configuration agent, for example, the "event log" file 210.2 for tracking the performance of the client computer (i.e. errors, file corruption, communication statistics, etc.) and a "configuration" file 208.2.12 which describes Universal Resource Locators, modem numbers, etc. necessary for the client computer 100 to communicate with the server system 130. The setup program/installation agent 202 also determines if a previous version of the client program 200 has been installed and if updating of the previous version to a newer version is required.

Completing the Subscriber Account Detail (208.2) (Step 440):

The newly established subscriber can complete the subscriber account detail 208.2 either on-line or off-line (with respect to the server system). The representative embodiment of the present invention describes the method of completing the subscriber account detail 208.2 off-line with respect to the server system 130, but it will be appreciated that the spirit and functionality of the present invention are not altered if completion of the subscription detail information is performed on-line.

The subscriber account detail 208.2 sub-directory consists of a plurality of files such as, for example, "contact detail" 208.2.2, "configuration" 208.2.12, "web tracker" 208.2.6, "subscriber news and advertising" 208.2.10, "personal address book" 208.2.14, etc. as discussed in greater detail below. To complete the subscription detail, the subscriber is presented with screens containing menu selections necessary to complete the desired information. One of the multiplicity of programs which make up the client program 200 is a program which manages the subscription process. In the representative embodiment of the present invention this program is titled the "subscription manager" 208.

The client program 200 (once installed and configured on the client computer 100) executes the subscription manager 208 and the subscription manager 208 presents the subscriber with a series of screens (via user interface 102) which present the subscriber with known information about the subscriber, if any (i.e. subscription header information) and the subscriber's client computer, if any (i.e. configuration information) and asks the subscriber to provide subscription detail information (FIG. 2-D). The screens, commands, menu items, etc. of the subscription manager 208 lead the subscriber through the process of completing the subscriber account detail information 208.2 as discussed in further detail below.

Contact Detail File 208.2.2: The subscriber contact detail file 208.2.2 contains information about the subscriber such as that illustrated in FIG. 2-D. It will be appreciated that the information listed in FIG. 2-D is only representative data and could very well include additional data or a subset of the data listed. The subscriber contact detail file 208.2.2 is stored on the client computer 100 in the "subscriber account detail" sub-directory 208.2 and a copy of the file uploaded to the server system 130 for storage and is identified by the subscriber's UCL 1508.

Subscriber News & Advertising 208.2.10: The subscriber has the option of including news and advertisements 208.2.10 in his/her subscription (i.e. submitting news and advertisements to the server system for storage and later downloading by users). If the subscriber elects to include news and advertisements 208.2.10 in their subscription they are then presented with a news and advertising setup screen where the subscriber records information about the news and advertisements 208.2.10 to be associated with their account and later stored on the server system 130. The news and advertising setup screen will present the subscriber with, for example, questions/options such as; the number, type (graphic, animated graphic, audio, video, etc.), format (banner, spot, etc.), file type (BMP, MPEG, JPEG, TIFF, etc.), start date (i.e. the date the ad is eligible for downloading to users), end date (i.e. the date the ad(s) is to replaced or over written), frequency, etc. The actual advertisements 208.2.10 themselves may be up-loaded to the server system 130 at the end of the subscription detail process or delivered to the server system at a later time and periodically in the future as the subscriber develops new advertisements.

Optional Services Profile 208.2.4: The subscriber may select additional services such as, for example, "change of address", "Web tracker" 208.2.6, "language translator", and others (described in greater detail in the summary section titled Optional Services). As these optional services 208.2.4 are selected the subscriber is presented with setup screen(s) for the associated optional service(s).

Upland Detail to Server Steps 442 & 445: The subscriber completes the subscriber account detail information 208.2, causes the client computer 100 to establish a communication session with the server system 130 and up-loads (i.e. transfers from the client computer 100 to the server system 130) the subscriber account detail information 208.2 to the server system 130. The server system 130 then stores the subscriber account detail information in the previously created sub-directory 264.6 (on the server system 130) associated with this particular subscriber and identified by the subscriber's UCL 1508. If the subscriber has elected to complete the subscriber account detail information 208.2 on-line then the subscriber completes the information on-line and the Subscription/Registration server(s) 137 stores the subscriber detail file in the "subscription and registration sub-directory 264.6 on the server system.

It will be appreciated that the creation of a subscriber account and submission of subscriber account detail information can be performed by the subscriber or by an authorized agent or representative of the subscriber such as, for example, a printer or manufacturer of business cards.

Figure 5:
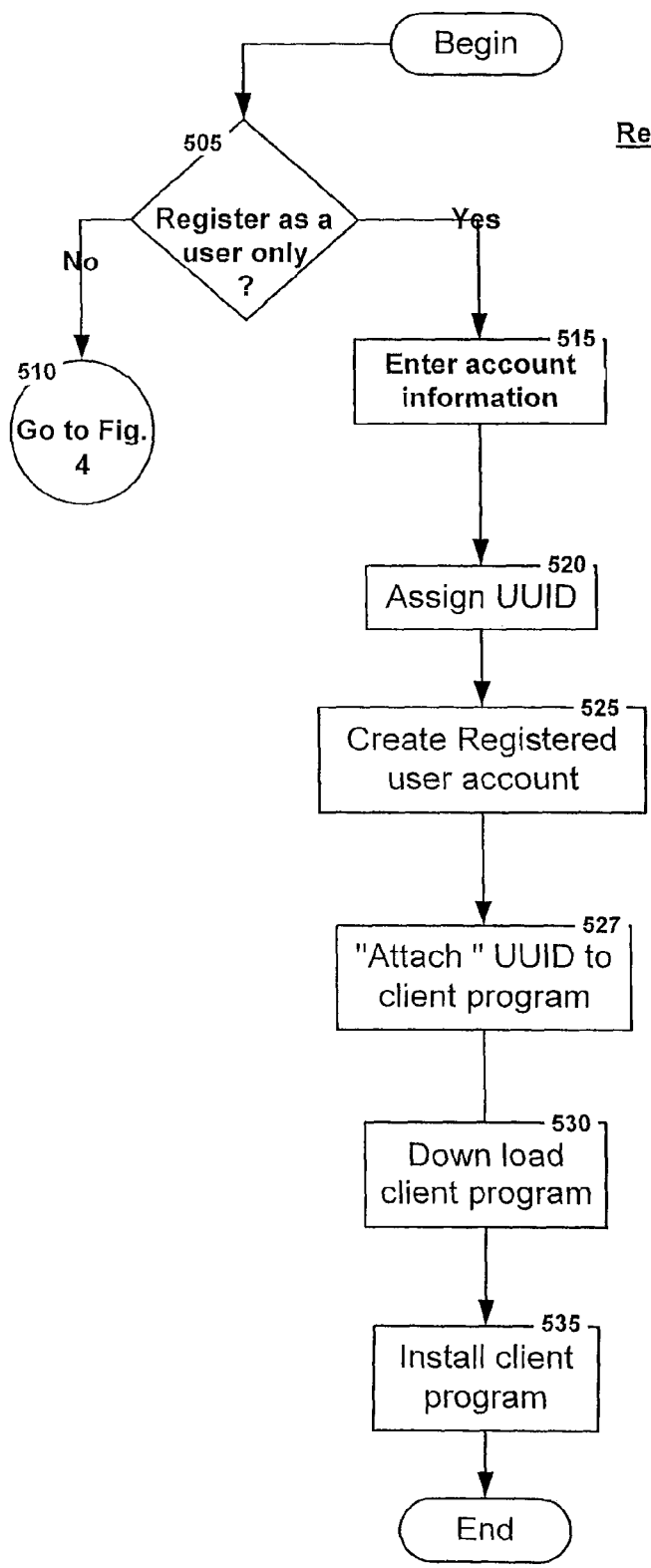
FIG. 5 is a block diagram illustrative of the user registration process.
Figure 6:
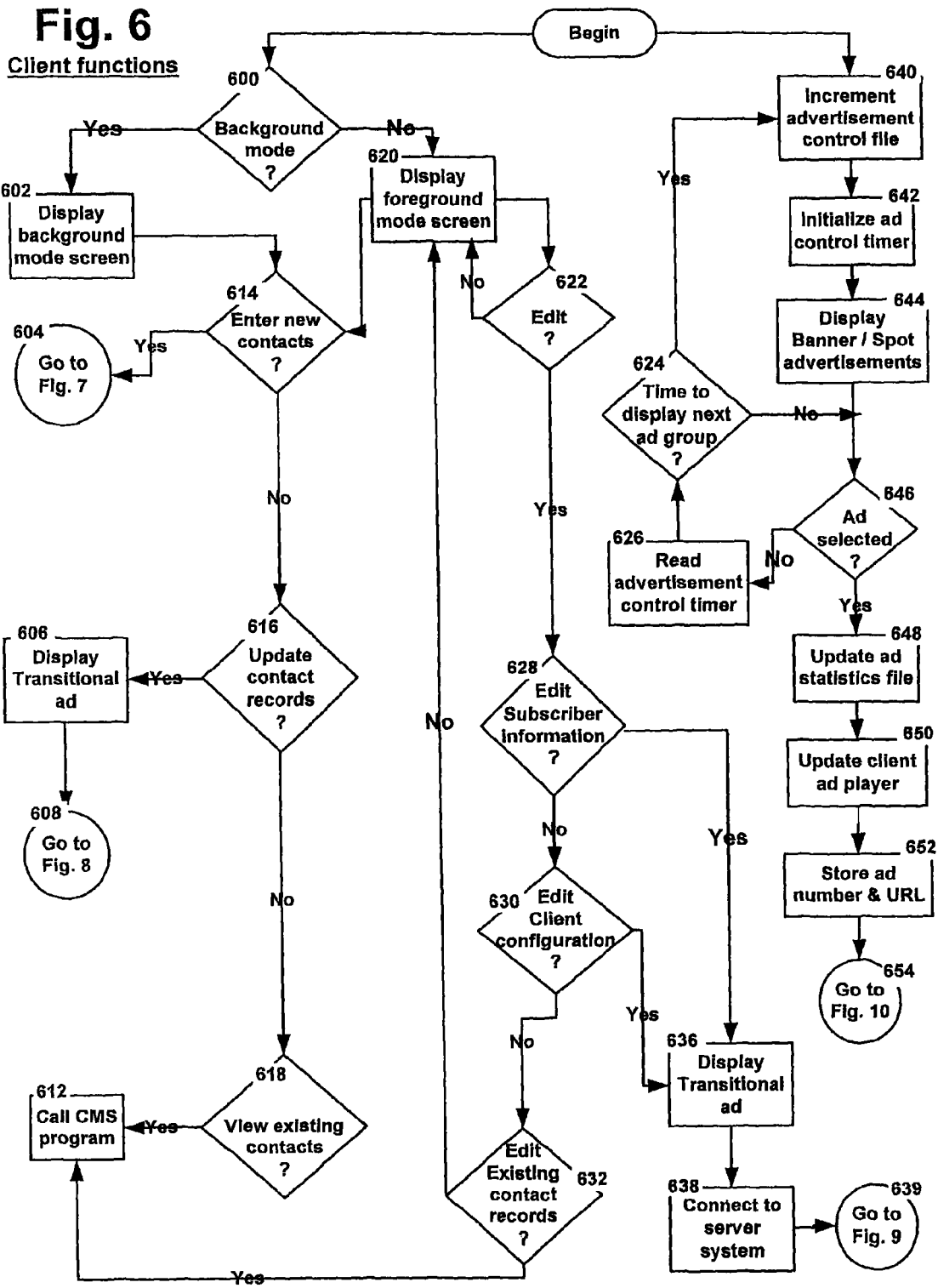
FIG. 6 is a block diagram illustrating representative client program functions.

Establishing a Registered User Account FIG. 5:

A first-time user of the invention establishes communication with a Subscription & Registration Sever(s) 137 for purposes of establishing a Registered User Account (FIG. 5) and the subscription and registration manager 252 presents the subscriber with a "Subscription and Registration" screen. The first-time user is asked to enter account information (step 515) (certain information is required to become a registered user, some is not) such as, for example, name, company name, title, phone number, email address, etc. Certain additional information may be collected for marketing purposes, but is not required. Once the user has completed the required registration information they are considered a registered user (referred to herein as simply a "user"). The subscription and registration manager 252 then automatically assigns a unique Universal alpha-numeric User Identifier (UUID) (step 520) and creates a Registered User Account file (step 525), "attaches" the UUID to the client program (step 527) and downloads the client program 200 (step 530) to the user's client computer 100 and terminates the communication session between the user client computer 100 and the server system 130. The client program for the registered user is installed (step 535) according to the same procedures as described above for the subscriber. The UUID is an alpha numeric string of characters of substantially the same nature as the UCL, but will identify to the server system 130 that this user is a registered user and not a registered subscriber. A registered user identified with a UUID has the same privileges relative to the server system as a subscriber identified by a UCL with the exception that the registered user does not have the ability to submit and store his/her own outbound information (i.e. contact and advertisement information) on the server system. A user only receives inbound information (i.e. the subscriber outbound information submitted by the subscriber). A subscriber is also, typically, a registered user and accordingly is provided with a client program, but a registered user is not (necessarily) a subscriber. A registered user (herein referred to as simply a "user") can become a subscriber by subscribing to the server system 130 and completing the necessary subscriber information.

UUID: A Universal User Identifier (UUID) is assigned (step 520) to each individual client program 200 as it is downloaded from the server system 130 to the user client computer 100 and the same UUID is also assigned to the individual registered user. If the client program 200 is downloaded from the server system 130 via the remote network 120 then the server system assigns the UUID to the user at the time the user registers and the server system 130 downloads the client program 200 to the user's client computer 100. If the client program 200 is received by the user by means other than downloading via the remote network 120 then the UUID assigned to the client program is not associated with the user until such time as the first-time user establishes a communication session with the server system 130 and registers as described above.

Installing the User Client Program (Step 535):

The user client program 200 must be installed on the client computer 100 and properly configured before the registered user can operate the user client program 200. The term "user client program" is used herein simply to distinguish the client program 200 installed on a user's client computer 100 from the client program 200 installed on a subscriber's client computer 100. The user client program and the subscriber client program may be, in all respects, essentially identical programs.

The subscription & registration manager 252 attaches the user's UUID (step 527) to the client program and downloads the client program (step 530) to the client computer 100. It will be appreciated by one with skill in the art that it may be beneficial for the server system 130 to down load a client program 200 which is capable of operating on a variety of client computer operating systems 101 and of communicating with a wide variety of CMS (Contact Management System) systems 216 (i.e. Act, Gold Mine, Outlook, Palm Pilot, etc.). Conversely, in the interest of efficiency, it may be beneficial for the user to select (or the server system to automatically assign), while on line with the server system, a client program 200 which is optimized specifically for one or a subset of operating platforms 100 & 101 and is capable of communicating with just one or a subset of the possible CMS systems 216 available.

Referring now to FIG. 5, once the user account information is complete and the user's UUID is assigned (step 520), the server system attaches the user's UUID to the client program (step 527) and downloads, i.e. transfers, (step 530) the client program including the user's own UUID to the user's client computer 100 for installation (step 535) of client program 200 on the user's client computer 100.

Just as in the case of the subscriber client program 200, it will be appreciated by one with skill in the art that there are a multitude of viable methods for installing and configuring the client program 200 on the user's client computer such as, for example, downloading the client program 200 over the remote network 120 and automatically installing the client program 200 on the client computer 100 using an installation and configuration agent 202 or manually installing the client program 200 from a floppy disk, CD ROM, tape, DVD, etc. with the assistance of an installation and configuration script or wizard 202 (as well known in the art). An installation and configuration agent 202 might, for example, accompany the client program 200 which could automatically configure and install the client program 200 on the client computer 100. The representative embodiment of the present invention provides for the automatic delivery, installation and configuration of the client program 200 via remote network 120 and an installation agent 202 and is but one example of how the client program 200 delivery, installation and configuration might be accomplished.

The client program 200 includes a setup program/installation agent (or script) 202 which will determine if there is sufficient space on the storage device 104 of the client computer 100 in which to install the client program 200 and to store advertisements 206.2 and news items 206.6 (to be down loaded to the client computer in the future) and additional contact records 208.2 (to be loaded in the future). When run, the setup program/installation agent 202 automatically creates the necessary directory(s), sub-directories, icon(s), etc. on the client computer 100. The installation agent typically automatically identifies client computer resources (such as drive and path names, modem configuration, CMS/PIM manufacturer and version, etc.) and automatically installs the client program. Alternatively, the installation script may prompt the user for information to assist in the installation such as modem type and speed, phone dialing procedures (i.e. access to outside dial tone), directory paths, CMS/PIM information, optional functions, etc. The installation agent then installs and stores the client program 200 and it's associated files and executable programs in the directory(s) and it's associated sub-directories. For example, the directory created by the installation agent/setup program might be labeled "Webbcard". The installation script/agent then creates a plurality of sub-directories (as are well know by one with skill in the art) such as, for example, a "Webbcard.bin" sub-directory for executable program(s) and associated DLL's, a "Webbcard.tmp" sub-directory for temporary files, etc. The installation agent might also create sub-directories such as, for example, an "in-bound" sub-directory which the client program will use to locate storage of user inbound information UII files (i.e. contact details and advertisement information) transferred from the server system to the client program, and an "outbound" sub-directory to locate user outbound information UOI files that contain information that is to be transferred to the server system 130 from the client computer 100. The installation and configuration agent 202 also creates other files necessary for the proper functioning of the client program. Other files are automatically created by the installation and configuration agent, for example, in the "outbound" sub-directory such as, for example, a "pending contacts" file 212.4 for storage of entered UCL's prior to transfer to the server system, a "viewer statistics" file 210.4 for storing statistics related to the user's viewing (of ads and news items) statistics, an "event log" file 210.2 for tracking the performance of the client computer (i.e. errors, file corruption, communication statistics, etc.), etc. Examples of files created under the "inbound" sub-directory might include, for example, a "news and advertising player" 206 file to locate the program(s) which display the news and advertising items 206.2 and 206.6 to be downloaded to the client computer in the future. Other files automatically created by the installation agent 202 might also include, for example, an "advertisements" file 206.2 for location of advertisements (such as illustrated in FIG. 11-C) down loaded from the server system, an "inbound contact spooler" file 212.6 for temporary storage of inbound contact details prior to transfer to the PIM/CMS, a "configuration" file 208.2.12 which describes Universal Resource Locators, modem numbers, and other parameters necessary for the client computer 100 to communicate with the server system 130. The setup program/installation agent 202 also determines if a previous version of the client program 200 has been installed and if updating of the previous version to a newer version is required.

Figure 7:
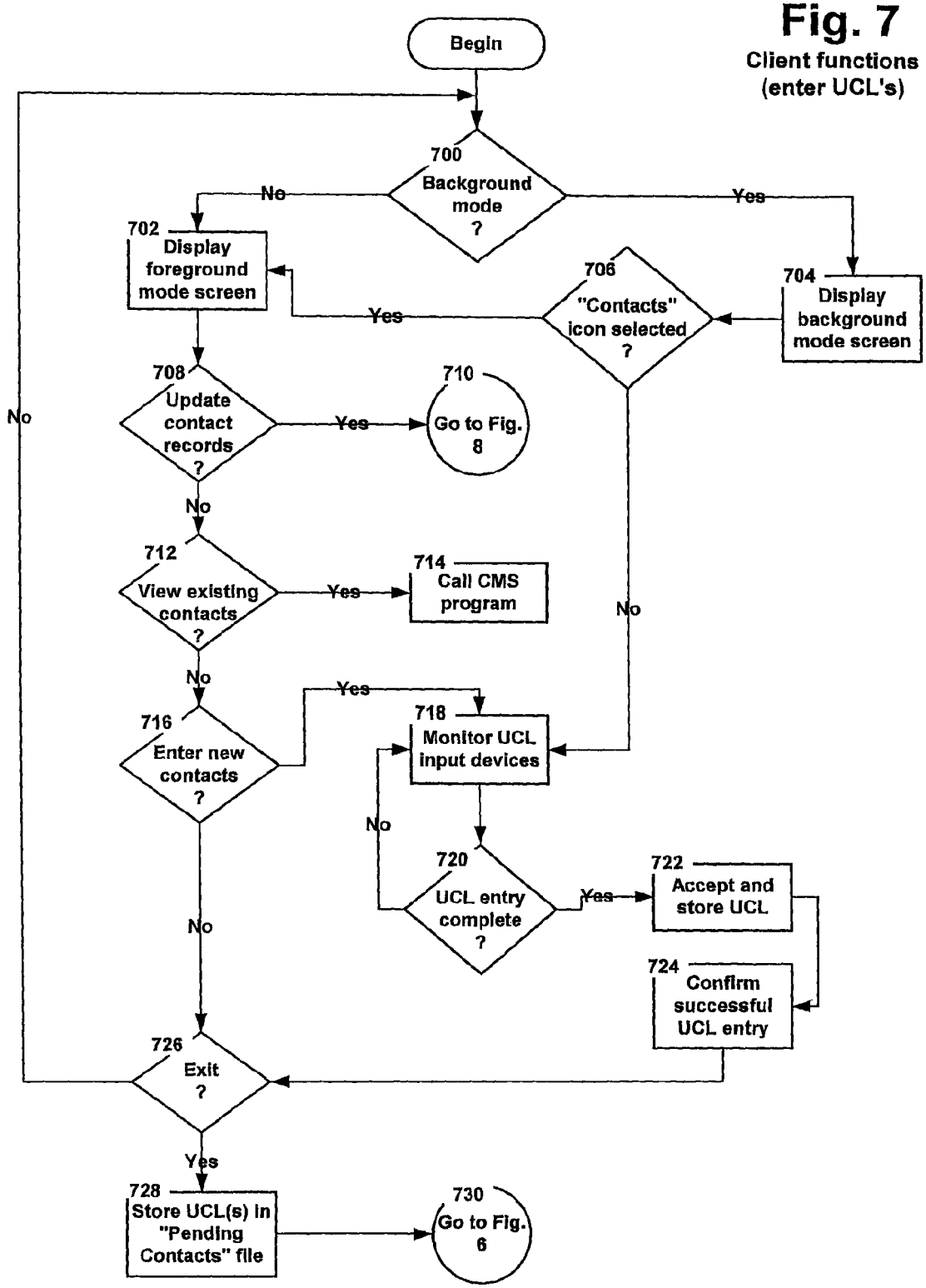
FIG. 7 is a block diagram illustrating UCL processing on the client computer.

Receiving Card Holder (Subscriber) Information (FIG. 7):

Referring now to FIG. 7. In the representative embodiment of the present invention the user may configure the client program to start up in one of two primary display modes (step 700) i.e. "foreground mode" as illustrated in FIG. 11-B or "background mode" as illustrated in FIG. 11-A. The user can easily alternate between foreground and background modes by activation of a command. If the client program 200 is configured to start up (i.e. run the client program 200 and display the first display screen) in foreground mode, then upon start up (either manual or automatic) of the client program 200 the client program 200 will cause (step 702) a first screen such as that illustrated by FIG. 11-B to display on the output device 102 of the client computer 100. Foreground mode provides the user with display elements (i.e. menu items, program commands, controls, etc.) such as, for example, 1102, 1104, 1108, 1110, 1112 displayed on the first screen as well as news and advertising display elements 1114, 1116, etc. displayed simultaneously with the menu and control display elements on the first and subsequent screens. If the operating platform (i.e. operating system, programming language, and hardware) of the client computer 100 support a "windowing" type of user interface (as well known in the art) (such as Microsoft Windows) then the display elements (i.e. screens, data entry fields, menu items, etc.) displayed by the client program 200 on the output device 102 of the client computer 100 may be displayed in re-sizable windows (as well known in the art).

Display element 1102 is a "pull down menu", as well known in the art, and allows the user to activate or deactivate additional program functions and display elements (such as display elements 1104, 1108, 1110, and 1112. Selection of a data entry field such as, for example 1108, allows the user to enter data such as UCL's as described in greater detail below in the section titled "RECEIVING SUBSCRIBER INFORMATION".

If the client program is configured to start up in background mode, then upon start up of the client program 200 the client program will cause a first screen such as that illustrated by FIG. 11-A to display on the output device 102 of the client computer 100. In the representative embodiment of the present invention, the background mode allows the client computer 100 to run (i.e. execute) and display other programs (herein referred to as "companion programs") such as, for example, a word processing program, email program, spread sheet program, etc. within a companion window 1101 of a first screen and additional screens of the client program 200. Other display elements of a first screen of the client program 200 such as, for example, display elements 1114, 1116 (news and advertising display elements) etc. are displayed independently of items displayed within companion window 1101. The user can enter UCL's 1508 (illustrated by 1506) into the client program 200 in background mode via automatic input devices such as magnetic stripe (1506) reader 117 or bar code reader 118 or other such automatic input devices. While in background mode client program 200 confirms valid automatic entry of UCL's by generating an audio tone via audio device 111. Alternatively, the user can display additional display elements such as, for example, 1108 in companion window 1101 by selecting (i.e. by clicking on the displayed object with a pointing device 116 or other such pointing devices as are well known in the art) one of a multiplicity of display elements such as, for example, 1103, 1105, etc. By selecting display element 1103, for example, the client program 200 causes a display element such as a "drop down menu" (as well know in the art) such as, for example, 1102 to display. By selecting a command from a display element such as, for example, display element 1105 or drop down menu 1102, additional display elements such as a "data entry field" such as, for example, 1112 or 1108 can be displayed. Display of a data entry field such as, for example, 1108 (UCL entry field) allows the user to enter data manually into client program 200 via manual input devices such as keyboard 114 or Audio Input unit 113 while the client program 200 is operating in background mode.

To Recap: A first screen such as that illustrated by FIG. 11-A is displayed if the client program is configured to startup in background mode and additional display elements such as data entry fields such as, for example, 1108 can be added to companion window 1101 by the user selecting certain display elements. Background mode is conducive to concurrent display and operation of the client program and a companion program (displayed within companion window 1101) such as, for example, a word processing or email program. A first screen such as that illustrated by FIG. 11-B is displayed if the client program 200 is configured to startup in foreground mode. The user can easily alternate between foreground and background modes by selection of a command from a pull down menu or display element such as, for example, 1102, 1103, or 1105. For purposes of discussion the representative embodiment of the present invention illustrates the foreground mode of operation.

Receiving Subscriber Information: A user receives a business card 1502 from a subscriber. The business card 1502 is encoded with a UCL in human readable format 1508 and/or machine readable format 1506 as described below. The user (and/or subscriber) will, by definition, have a copy of the client program 200 as well as his/her own personal UCL or UUID installed on his/her client computer 100.

Referring now to FIG. 7 and FIG. 11-B the user selects the "enter" icon from selection menu 1102 of a first screen FIG. 11-B of the client program 200 and is presented with a UCL entry window 1108 and a UCL confirmation window 1110. As noted above The user manually enters via manual input device(s) 113 or 114 (or other such manual input devices) the UCL 1508 or automatically enters via automatic input device(s) 117, 118 or other such automatic input device (i.e. smart card reader, OCR, MICR, etc.) the UCL 1506 from the subscriber's business card 1502 into the client program 200 on the client computer 100. Traditionally, manual data entry is prone to errors (more so than automatic data entry). Accordingly, when entering UCL's manually, the user has the option (though is not required) to enter supplemental information of the card issuer (subscriber) such as, for example, all or a portion of the subscribing business card issuer's last name (in UCL entry window 1108) in addition to the UCL 1508. The entry of two separate identifiers (UCL and last name) helps to reduce delivery of incorrect contact details (as explained below).

When entry of the UCL 1508/1506 and/or last name is complete the client program 200 displays the entered UCL and/or last name of the subscriber in the confirmation window 1110 and stores the UCL 1508 and/or supplemental information (such as the subscriber's last name) in a "pending contacts" file 212.4 on the client computer 100. The user can attach notes to the UCL 1508 by entering notes in the notes window 1112. The notes are stored in a "pending contact" file 212.4 on the client computer 100 and later passed to the CMS/PIM program 216 once contact details 208.2.2 are down loaded to the client computer 100 (as explained in further detail below).

Connect to the Server System: The client program 200 will continue to accept and store UCL's 1508, supplemental information, notes, etc. until the user indicates that he/she has finished entering UCL's. The client program 200 then, based on one or more of a multitude of conditions, causes the client computer 100 to establish a communications session with the server system 130 via remote network 120. The client computer 100 contains a web browser (such as, for example, Microsoft Internet Explorer or Netscape Navigator) or other such Internet or remote network navigation technology and a communications interface 112 to facilitate communications via the remote network 120 to other computers capable of communicating via the remote network 120 and specifically, the server system 130.

The client program 200 is delivered to the user and installed on the user's client computer 100 with the pre-established URL 1510 of the server system 130. The client program automatically passes the pre established URL 1510 of the server system 130 to the web browser (or other such navigation and communication program) of the client computer 100 and causes the client computer 100 to establish a communications session via remote network 120 to the server system 130. It will be apparent to one with skill in the art that there are numerous methods by which the client computer 100 might initiate the communication connection between the client computer 100 and the server system 130. One such communication initiation method might be, for example, the user actively selecting a command from a menu such as "update contacts" (i.e. selecting "Update" from menu item 1102). Another communication initiation method might be, for example, the client program 200 causing the web browser (or operating system 101) of the client computer 100 to spawn an additional Internet connection while the client computer 100 is already communicating via the web and simultaneously performing other tasks. Yet additional initiation methods might be, for example, the client program 200 identifying the completion of the entry of the UCL (either manually or automatically), or by the passage of time, by lack of input activity, or by numerous other conditions.

For example, in one embodiment, the user establishes a connection to the Internet (remote network 120) for the purpose of checking email. Once the connection has been established between the client computer 100 and the Internet (or World Wide Web), the client program 200 spawns (or causes the operating system, web browser or other such program of the client computer 100 to spawn) an additional process/connection (as well known in the art) to the remote network 120 and causes the web browser or other such program of the client computer 100 to establish a second communication session simultaneous with the first communication session, the second communication session being a communication session between the client computer 100 and the server system 130.

In another embodiment, the user scans the UCL 1508 encoded on a business card 1502 & 1504 in machine-readable format 1506 into a palmtop (i.e. hand-held) client computer 100. A control character at the end of the UCL 1508 causes the client program 200 on the palmtop client computer to cause the palmtop client computer's modem to establish a wireless connection via remote network 120 to the server system 130 for purposes of communicating inbound and outbound information between a client computer 100 and a server system 130 as described herein.

Alternatively, a supplemental client computer 115 (i.e. a palmtop computer or personal digital assistant, as well known in the art) reads (i.e. scans via bar code or magnetic stripe, etc.) one or multiple UCL's 1508/1506 from one or multiple encoded business cards 1502/1504 and stores the UCL's in a pending contacts file on the supplemental client computer 115. After a pre-determined period of idleness (i.e. no input activity) of, for example, 10 minutes, the supplemental client computer 115 automatically establishes a communication session with a client computer 100. The communication session between the supplemental client computer 115 and the client computer 100 might be via one of a multiplicity of methods such as, for example, infrared communications, radio communications, cellular, satellite, wire based, etc. The supplemental client computer 115 then synchronizes (as well known in the art) it's contact database with that of the client computer 100 whereby the supplemental client computer 115 transfers the contents of it's pending contacts file (i.e. stored UCL's) to the client computer 100 and client computer 100 transfers to supplemental client computer 115 newly received contact detail information (information received since the last time the supplemental client computer 115 and the client computer 100 synchronized data). The client computer 100 then, either concurrent to the communication session with the supplemental client computer 115 or at a later time, communicates with the server system 130 via remote network 120 and uploads the newly received pending contacts information (received from supplemental client computer 115) and the process proceeds as described herein for transfer of information between client computer 100 and server system 130. Concurrent to establishing a communication session with the client computer 100, the supplemental client computer 115 automatically displays news and advertising information (FIG. 11-C) and status information to the user on the output device of the supplemental client computer 115.

In yet another embodiment, the client program 200 monitors Input/Output activity in much the same manner as a "screen saver" (as well known in the art) might and waits for a period of inactivity. After a preset period of time has passed without the requisite I/O activity (keyboard activity, mouse activity, printer activity, network activity, etc.), the client program 200 automatically causes the client computer 100 to establish a communications session with the remote server system 130.

Concurrent to establishing a communication session with the server system 130, the client computer 100 automatically displays news and advertising information (FIG. 11-C) and status information to the user on the output device 102 of the client computer 100. Display of news and advertising information is expressed in greater detail below in the section titled "NEWS AND ADVERTISING".

Figure 13:
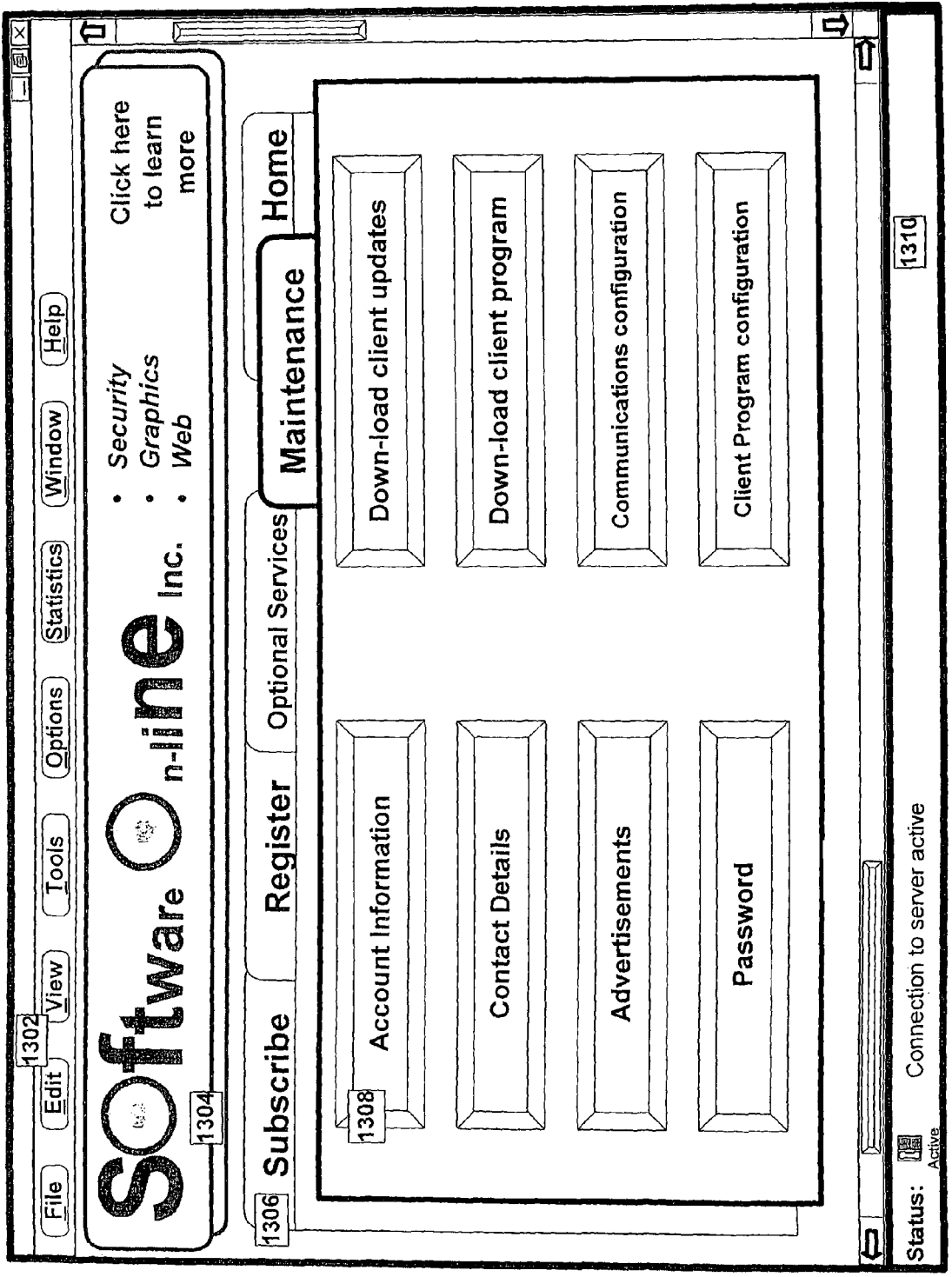
FIG. 13 illustrates an example server system menu screen depicting an example maintenance menu.
Figure 14:
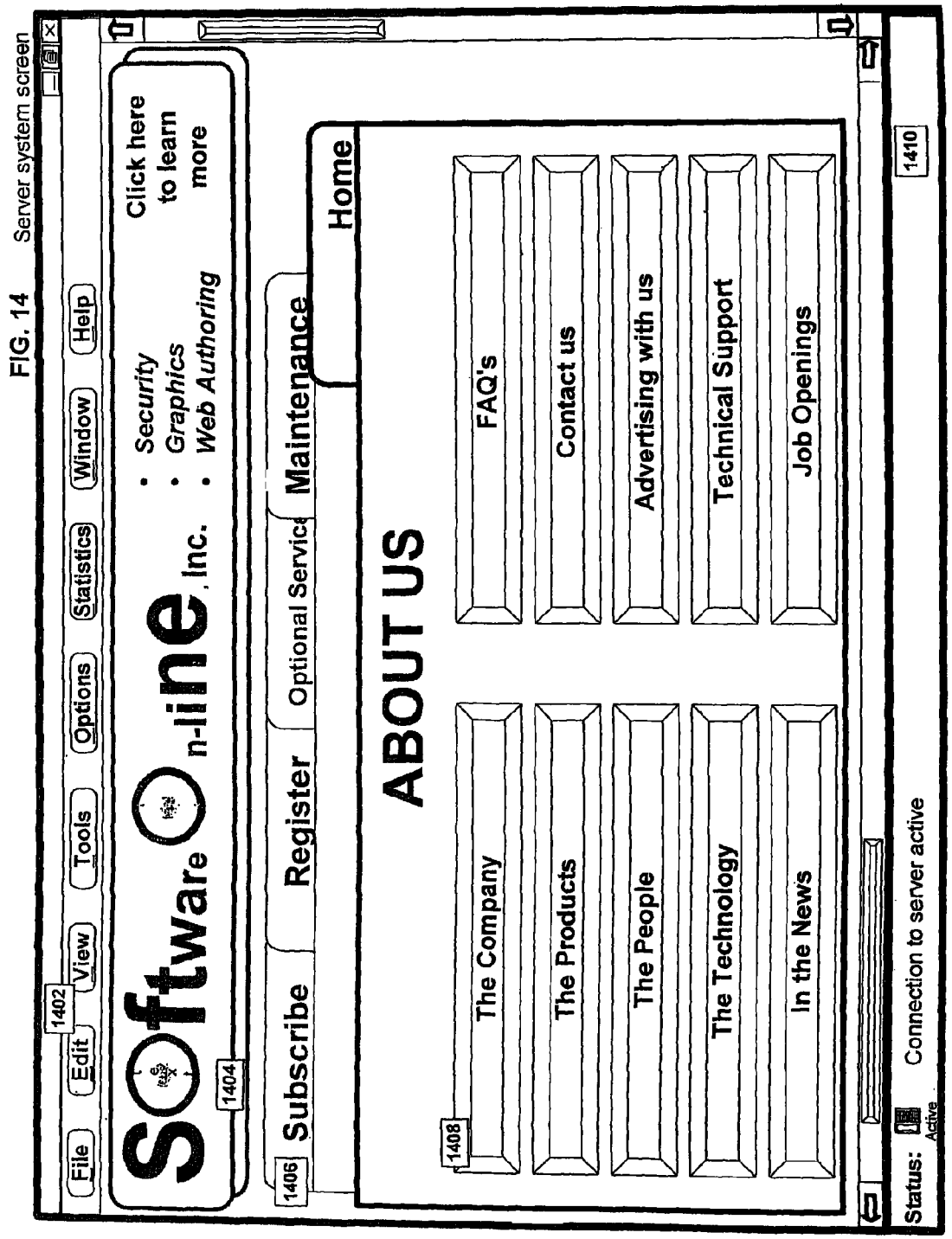
FIG. 14 illustrates an example server system menu screen depicting an example server system home web page.

Transfer Inbound and Outbound Information: Once the communication session between the client computer 100 and the server system 130 has been established, the server system 130 automatically displays server system advertisements 1304 such as illustrated in FIG. 13 to the user and also displays a "status indicator" 1310. The server system advertising may take the form of banner ads such as 1304 or spot ads or focus ads. Server system banner, spot, and focus ads may be displayed individually or in any combination depending on the function the server system is performing. For example, if a first time user has established the communication session with the server system 130 for purposes of registering, then the server system might display a "server system home page" such as that illustrated in FIG. 14 which also, simultaneously, displays a banner ad 1404 to the first time user. Or, if a subscriber communicates with the server system 130 for purposes of updating his/her account information then the server system might display a banner ad 1304 to the subscriber simultaneously to displaying a "maintenance" screen such as that illustrated by FIG. 13. If the user is simply updating contact information then the server system may display a focus ad such as 1208 to the user.

Status indicator 1310 is a symbol and/or text message displayed on the output device 102 of the client computer 100 which indicates the current process (i.e. "transferring UUID", "uploading event log", etc.) which is taking place on the client computer 100, the server system 130, or between the client computer 100 and the server system 130.

Concurrent to the display of server system news and advertising information (FIG. 11-C) and status information 1310/1410 to the user, the client program 200 also automatically passes the user's own UUID (or UCL if the user is also a subscriber) to the sever system 130. The server system 130 utilizes the user's UUID/subscriber's UCL to identify the user so as to perform various statistical and maintenance functions. The statistics and maintenance files on the server system 130 which are accessed and updated by the server system may differ based on whether the user is only a user or if he/she is also a subscriber. For example, the server system 130 utilizes the subscriber's UCL to access and update the subscriber's "UUID summary file" 264.16 (i.e. the list of user's who have downloaded the subscriber's business card information), "UUID authorization" file (i.e. authorization for users to download additional details) and the subscriber's event log for example. The server system 130 utilizes the user's UUID to locate and update the users "UCL summary file" 264.14 (i.e. the UCL of every subscriber for whom the user has downloaded subscriber business card information), "viewer statistics file" (i.e. the list of ads displayed on the user's client computer which the user has viewed, when and for how long, etc.) and "event log", etc. A user who is not also a subscriber, however, does not have a "UUID summary file" or a "UUID authorization file" to update, but the server system will, for example, update the user's event log file and client configuration file. The server system 130 also uses the subscriber's UCL/user's UUID to aid in recovery and synchronization of data should the communications session be terminated prior to completion of data transfer.

The server system 130 then requests that the client program 200 transfer the contents of the client computer's outbound files from the client computer 100 to the server system 130. For example, the client computer 100 transfers the contents of the user's; viewer statistics file, event log, client configuration updates, etc., as well as the contents of the "pending contacts" file. If the user is also a subscriber then the client program will also upload changes/updates to the subscriber's; web tracker list 208.2.6, contact detail information 208.2.2, etc.

It will be appreciated by one with skill in the art that other automated "house keeping" tasks such as, for example, validating data, processing and reporting of errors, logging events, collecting statistics, etc. are also conducted by the client and server systems when communicating and/or transferring inbound and outbound information.

Figure 8:
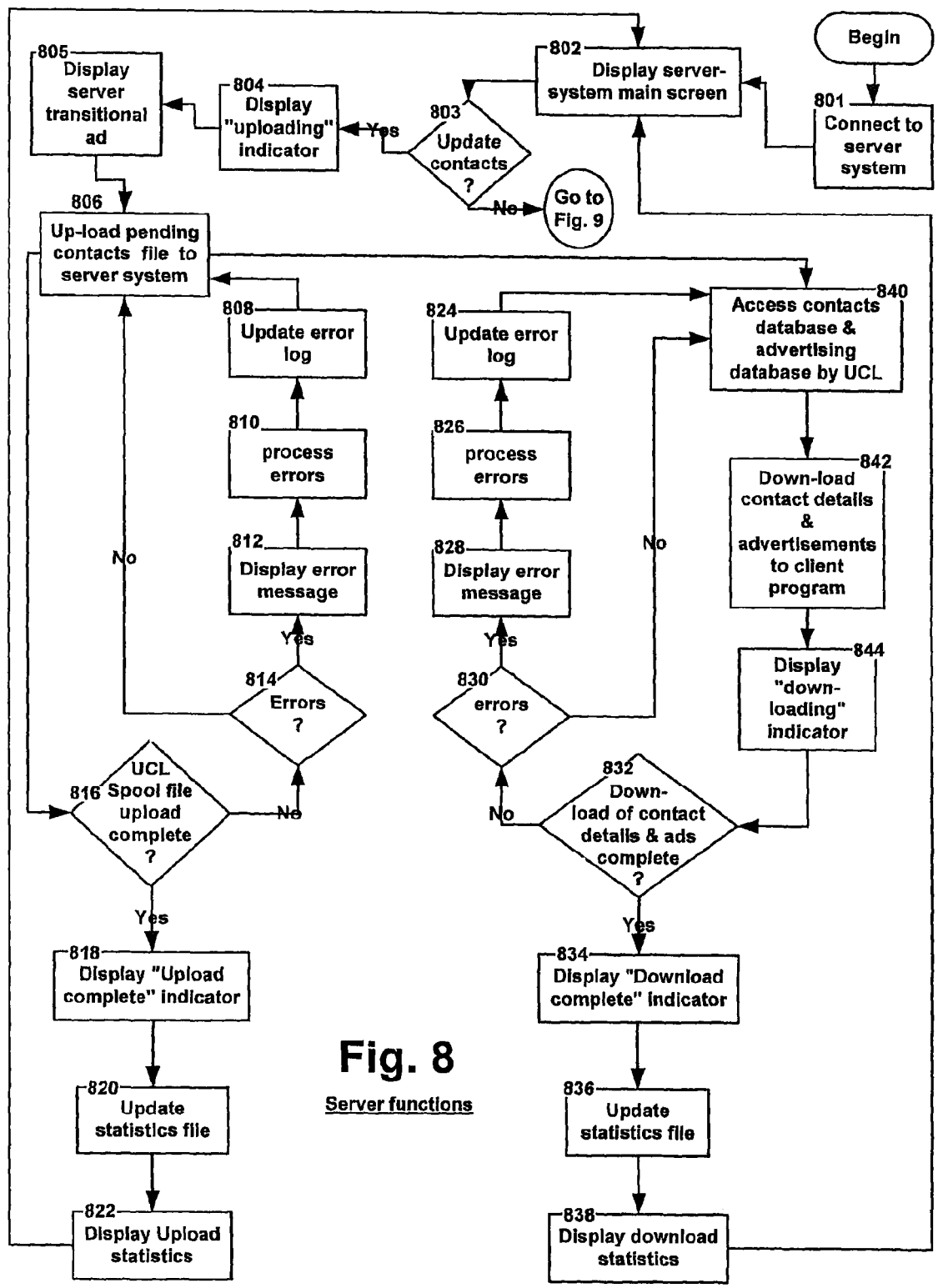
FIG. 8 is a block diagram illustrating the process of updating contact and advertising detail information on the client computer.

Referring now to FIG. 8, server system 130 receives the contents of the outbound information file(s) and accesses the associated files stored on the server system 130 and downloads the information (now "inbound information") to the client computer 100. For example, the client program 200 passes the contents of the pending contacts file 212.4 (step 806) to the server system 130 and the server system accesses (step 840) the contact detail and/or advertising file(s) (stored, for example, in the subscription and registration sub-directory 264.6) of each card issuer (subscriber) by their respective UCL and downloads i.e. transfers the contents of the files (i.e. contact details 208.2.2, advertisements 206.2, and advertisement controls 206.4) (step 842) to the "inbound spool file" (often referred to herein as the "inbound spooler") of the client program 200. Prior to terminating the communications session with client computer 100, the server system 130 also down loads to the client program 200 (in addition to the contact details, advertisements, and ad control information, etc.) the contents of any additional maintenance files such as, for example, bug fixes, configuration changes, etc. and terminates the communication session with respect to the client computer 100.

The client program 200 then loads the received data into the appropriate files on the storage device 104 of the client computer 100 i.e. the contact detail data 208.2.2 is loaded into the contact management system (CMS) 216, the advertising information is stored in the advertisement file(s) 206.2, the event log information is stored in the event log 210.2, etc.

The client program 200 stores the received contact detail 208.2.2 of each individual subscriber in the CMS/PIM 216 and associates each contact with their individual UCL. It will be appreciated by one with skill in the art that it is desirable that upon complete transmission of the UCL, contact and advertisement information, that the client program 200 will perform various confirmation tasks such as, for example, notifying the user of successful completion of the communications session including, for example, displaying a message to the user such as "x contacts and y bytes successfully downloaded, z errors", etc. and provide the user with the opportunity to resolve errors, correct incomplete data transmissions, etc. should errors occur. It will also be appreciated by one with skill in the art that many functions of the process of accessing and transferring of data, error processing, and other tasks can be executed as concurrent processes or sequential processes. The preferred embodiment of the present invention executes concurrently as many of the processes as is practicable such as, for example, the processes of display of real time status, display of advertising, uploading UCL's, downloading of inbound information, updating of server-system statistics files, data validation, data transfer, error processing, updating of client-program statistics files, etc. The preferred embodiment of the present invention may also, though not necessarily, execute the processes (whether concurrent or sequential) as background processes to other processes taking place concurrently on both or either the client computer and/or the server system. It will also be obvious to one with skill in the art that the relative timing and sequence of the various functions performed by the client and server programs can be modified without altering the spirit or functionality of the present invention. For example, the entry of UCL's into the client computer could be started concurrent to or even after establishment of the communication session with the server system such that the user is entering UCL's while connected to (on-line with) the server system. The server system could begin passing contact and advertising data back to the client program as soon as the server system receives the first UCL record (i.e. concurrent to the client program passing additional UCL's to the server system).

It will also be appreciated by one with skill in the art that the client computer can support multiple users. A multi-user client system would function substantially the same as a single user client computer. The multi-user embodiment of the present invention requires the association of multiple UCL's/UUID's with multiple associated contact detail files, but otherwise does not alter the spirit and intent of the representative embodiment of the present invention.

Encoding of Business Cards (and Other Social Communication Media (FIG. 15):

In the representative embodiment of the present invention the same UCL 1508 which identifies the subscribers contact and advertising information files stored on the server system is printed in human-readable format and/or encoded in one or more machine readable formats on the subscriber's business cards 1502/1504.

The printer of business cards prints the subscriber's UCL 1508 on the subscriber's business cards 1502/1504 along with other typical business card information. The URL 1510 of the server system 130 may or may not also be printed on the business card 1502/1504 in human-readable format 1510 and/or machine readable format 1506. It will be appreciated by one with skill in the art that the encoding of the UCL 1508 and/or the server system URL 1510 may be accomplished by a variety of methods such as, for example, by printing the UCL and/or URL in human readable and/or bar code, OCR, magnetic stripe, etc. readable formats on adhesive label media and applying the printed label to the subscriber's business card, or the UCL might be hand written for example. The UCL may also be communicated verbally to a user of the present invention. The human readable encoding may also be in one or more of a plurality of languages. The printing and/or encoding of the URL 1510 of the server system 130 will assist those recipients of business cards who are not at the time subscribers or registered users of the present invention to establish contact with the server system 130 for purposes of establishing a subscriber account or registered user account with the server system 130.

It will be appreciated by one with skill in the art that once the present invention becomes well established in the market, that the server system URL 1510 may not have to be printed and/or encoded on/in the subscriber's business card. When the present invention becomes well established it is likely that the client program 200 will already be provided as a standard feature of the client computer 100 as provided by the provider of the client computer. Accordingly, the client computers 100 belonging to recipients (of business cards) who are not yet subscribers or registered users will automatically establish a communication with the subscription and registration server 137 of the server system 130 without the operator of the client computer 100 having to manually enter or read the server system URL 1510 from the business card.

Figure 15:
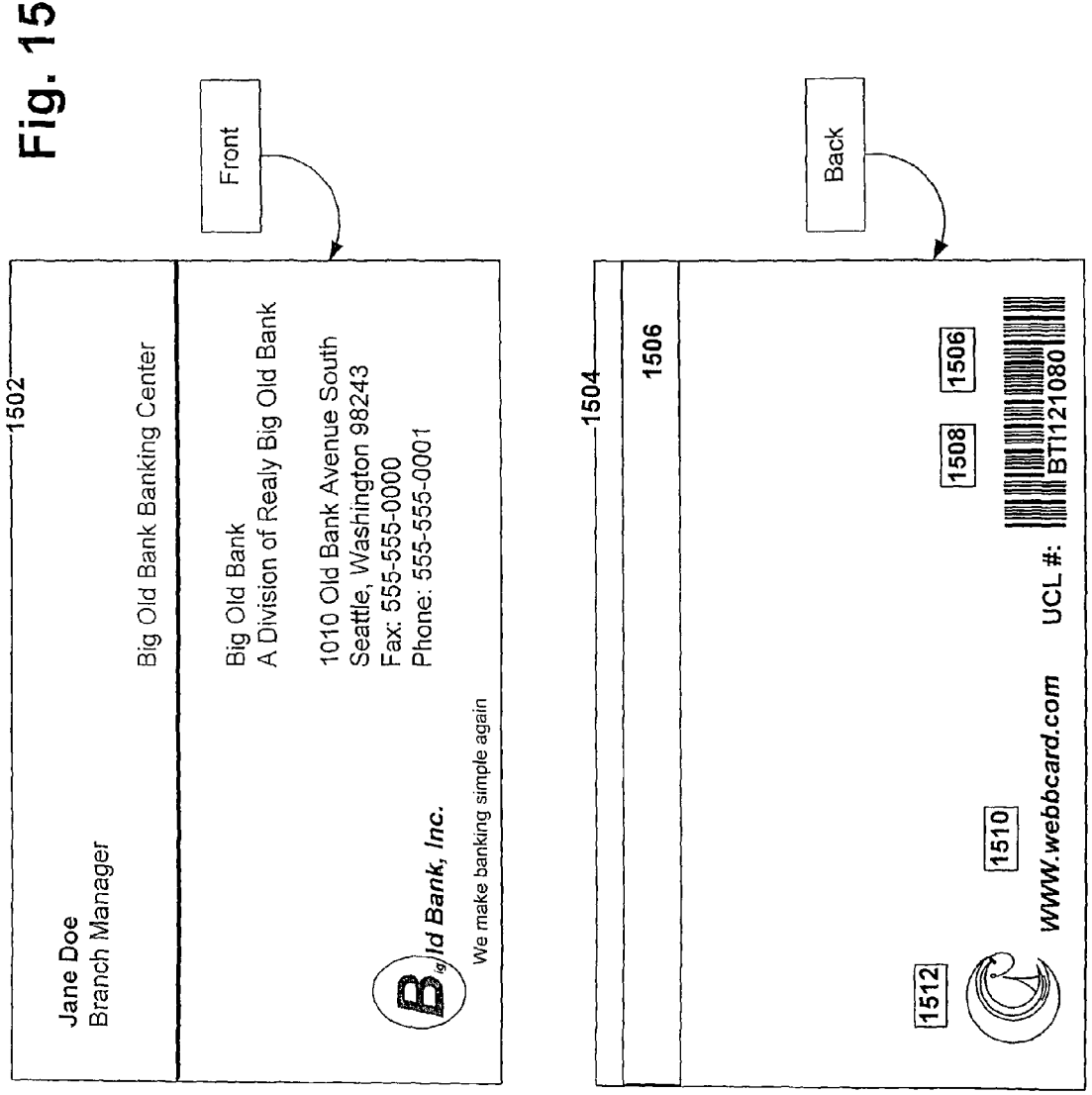
FIG. 15 illustrates an example business card front 1502 and back 1504 encoded with example human and machine-readable information.

It will be appreciated by one with skill in the art that the subscriber may have the UCL 1508 and server-system URL 1510 printed in human readable format and/or encoded in machine readable format(s) in any location on the business card surface or within the business card (i.e. smart chip technology) without materially altering the spirit or intended functionality of the present invention. In the representative embodiment of the present invention the UCL 1508 and server system URL 1510 are printed in human-readable format as well as encoded in one or more machine readable formats 1506. FIG. 1504 illustrates the server system URL 1510 and UCL 1508 printed on the back side 1504 of the subscriber's business card 1502. It will be apparent to one with skill in the art that there are numerous methods for encoding and transmitting the UCL 1508 and server system URL 1510 from the business card 1502 & 1504 to the client computer 100 including, but not limited to; bar code, magnetic stripe, "smart chip" (as known in the art), OCR (Optical Character Recognition), MICR (Magnetic Ink Character Recognition), OMR (Optical Mark Recognition), and others. It will also be apparent to one with skill in the art that the Universal Contact Locator (UCL) 1508 and server system URL 1510 may be present in human readable format only, machine readable format only, or both human and machine readable formats simultaneously. It will also be appreciated that the term "alpha numeric" is used herein to represent human and/or machine readable characters, but that characters used in the UCL may be other than alphabetic characters or numeric characters such as "@, #, $, %, etc. FIG. 15 illustrates just one of the many embodiments that are in accordance with the spirit and scope of the present invention. An alternate embodiment of the present invention would have the UCL and server system URL encoded in human readable format only. Yet another alternative embodiment of the present invention would have the UCL and server system URL encoded in machine-readable format only.

News and Advertising:

Subscribers submit news items and advertisements 208.2.10 to the server system 130 for storage on the server system. News and ads 208.2.10 can be textural, graphical (still or animated), video, audio or other digital format or a combination of any of the above. When submitting an ad 208.2.10 to the server system 130 the subscriber also completes an ad control profile 206.4 which is then associated with each ad. The ad control profile contains parameters which describe the ad type, actions, and display schedule.

Ad Types: The ad types include for example "banner" ads 1212 which are typically displayed at either the top or bottom of the client screen in a narrow window. Banner ads can be stationary or animated, but are typically animated (such as scrolling in a "ticker tape" fashion, flashing, changing colors, etc.). Spot ads 1214 are displayed at various locations on the client screen and are typically larger than banner ads. Spot ads can be stationary or animated. Advertisements can also include audio and video information.

Action Parameters: Action parameters determine the placement (i.e. location of an ad on the output device 102 of the client computer 100) of each ad (such as those illustrated in FIG. 11-C) on the output device 102 of the client computer 100 as well as the movements or animation an ad may be subject to. For example, a spot ad 1214 may originally appear in the upper right hand corner of the user's computer screen and remain stationary for 20 seconds, then begin to "slide" or scroll across the screen and "exit" off the left hand side of the user's screen. Action parameters also determine what actions the client program 200 is to perform should the ad be selected. For example, the user clicking on (i.e. with a mouse or other such pointing device as well known in the art) a spot ad 1214 or banner ad 1212 causes the display of a "focus ad" 1208. A focus ad displays additional information (relative to the spot or banner ad) in a larger window. Another action, for example, involves the user placing the pointing device image (i.e. mouse pointer) over a banner ad which then causes the banner to stop moving and then moving the pointer off of the ad will cause the ad to continue moving. Another action parameter causes a moving banner ad to change directions according to the direction of movement of the pointing device. For example, dragging the cursor or pointing device image from left to right over a banner will cause the banner to scroll from left to right.

Ad Display Schedule: The ad display schedule controls when the news and ad items 208.2.10 are downloaded from the server system 130 to the client computer 100, when the news item 206.6 or ad 206.2 is to be deleted (or over written) from the client computer, how often the news 206.6 or ad 206.2 is to be displayed to the user, etc.

The appropriate news items 206.6 and ads 206.2 (according to the news and ad scheduling parameters of the news and ad control profiles 206.8 and 206.4 respectively) are then down loaded to the client program 200 for display to users. Banner ads 1212 and spot ads 1214 are displayed continually at the periphery of the client screen (typically top and bottom of the screen for banner ads and on the right or left side of the screen for spot ads). Focus ads 1208 are displayed as a result of the user selecting (typically by "clicking" on) either a banner or spot ad. Focus ads 1208 are also displayed during the time the client computer 100 is establishing connection with the server system 130, and may also be displayed while the client and server systems are transferring data (i.e. while the client and server systems are uploading and downloading outbound and inbound information. Focus ads 1208 may also be displayed during and after the time the client and server systems are terminating communications. In other words, focus ads may be displayed during the entire process of the client and server systems establishing communications and while communicating and may continue to be displayed on the client computer after termination of the communication session with the server system until such time as the user closes the focus ad screen.

Figure 9:
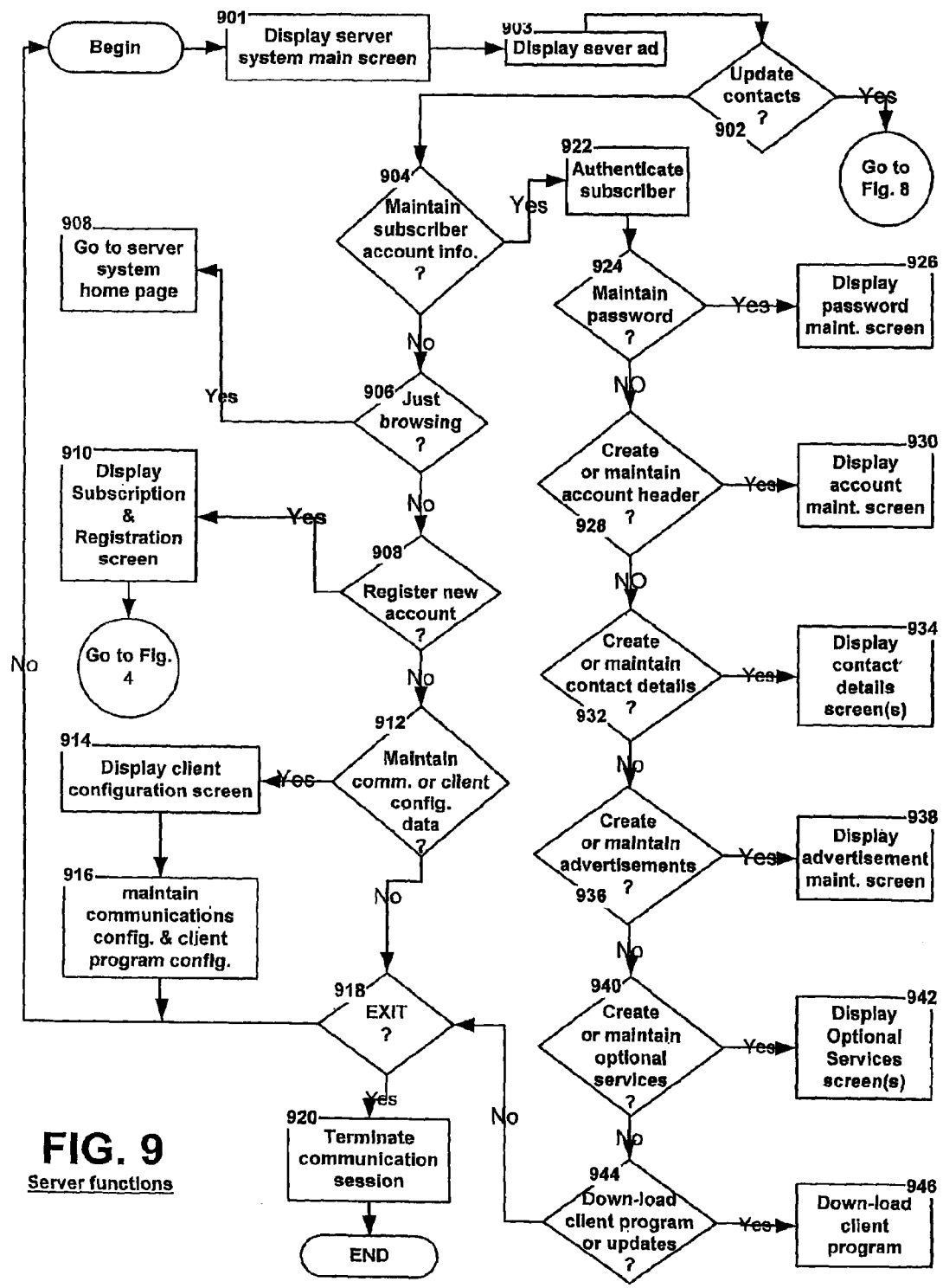
FIG. 9 is a block diagram which illustrates representative functions of the serve system.
Figure 12:
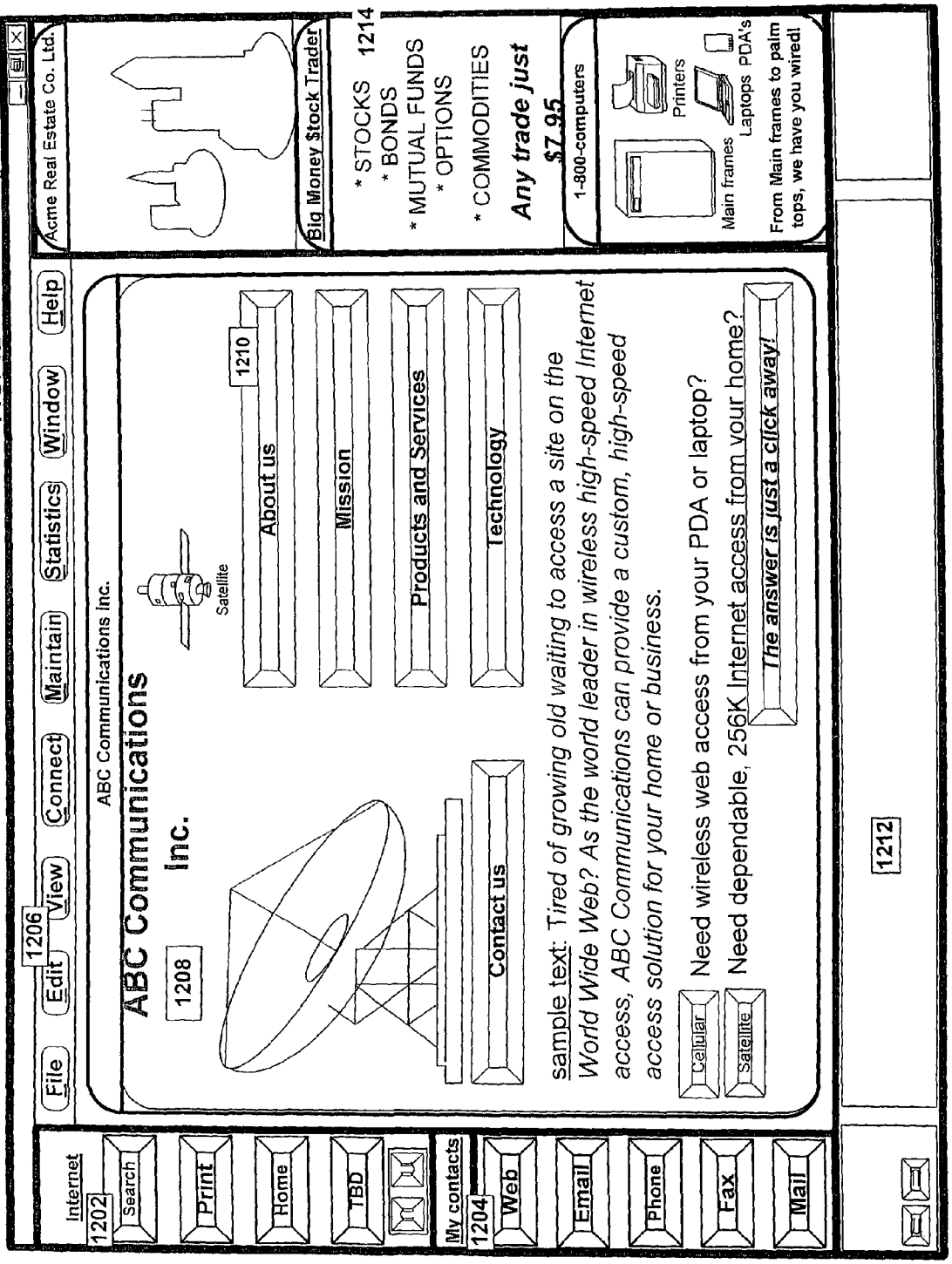

During communications sessions when the client computer 100 and server system 130 are uploading outbound information and/or downloading inbound information or during communication sessions intended to perform other functions such as user registration/subscription, system configuration, account maintenance functions, etc., (as illustrated in FIG. 9) the server system may display server-system transition advertisements such as 1302. These server-system transition ads (often referred to herein as "server ads") are stored only on the server system 130. Server ads can be provided by subscribers and/or third party advertisers. Server ads can be textural, graphical (still or animated), video, audio or other digital format or a combination of any of the above. When submitting a server ad to the server system 130 the subscriber also completes a server ad control profile which is then associated with each ad. The server ad control profile functions in essentially the same manner as the client ad control profile with exception of the fact that the server ad control profile is utilized by the server ad player to control the display of server ads not client ads. As such, the server ad control profile contains parameters which describe the ad type, actions, and display schedule of each server ad. Server ads are in all material respects (other than, potentially, content) identical to client ads with exception of where they are stored and when they are displayed to users. Server ads are stored on the server system 130 and are displayed when the client computer 100 and the server system 130 are communicating and, potentially, immediately after the termination of a communication session.

I claim:

1. A computer system within a computer network comprising:
    a client having an electronic circuit that communicates with the computer network and having program means configured to provide the client with access to a database of records of information that is not under common content control with a search engine that searches a plurality of content servers via the world wide web, each record having associated key words and configured to, when the client accesses on the computer network the search engine and provides to the search engine a word for a search on the plurality of content servers which is also one of the associated key words, cause the client to display information from the record associated with that key word in addition to information from the plurality of content servers provided by the search engine.

2. The computer system of claim 1 wherein the database of records is a contact information manager.

3. The computer system of claim 2 wherein the information displayed comprises information about a person or a group of people.

4. The computer system of claim 3 wherein the information displayed comprises contact information for the person or group of people.

5. The computer system of claim 1 wherein the information from the record is information sent to the client by a remote computer.

6. A method in a client computer system with an electronic circuit that communicates with a computer network, wherein the client computer has access to a database of records of information, each record having associated key words, comprising:
    receiving as input a request for a search on at least one word, the search directed via the computer network to a remote search engine that searches a plurality of content servers via the world wide web;
    providing the search request to the remote search engine; and
    checking the associated key words in the database of records for the at least one word, wherein the database of records is not under common content control with the remote search engine, and, if the at least one word is found among the associated key words, displaying information from the record associated with that key word in addition to information from the search engine.

7. The method of claim 6 wherein the database of records is a contact information manager.

8. The method of claim 7 wherein the information displayed comprises information about a person or a group of people.

9. The method of claim 6 wherein the information displayed comprises contact information for a person or group of people.

10. The method of claim 6 wherein the information from the record is information sent to the client computer by a remote computer.

11. A method in a client computer system with an electronic circuit that communicates with a computer network wherein the client computer has access to a database of records of information of a contact information manager, each record having associated key words, the method comprising:
    receiving as input from a user a request for a search on at least one word, the search directed via the network to a remote search engine that searches a plurality of content servers via the world wide web;
    providing the search request to the remote search engine; and
    checking the associated key words in the database of records for the at least one word, and, if the word is found, in addition to displaying information from the search engine responsive to the search request, displaying, to the user, information from a contact information manager record associated with the at least one word, which information comprises contact information for a person or a group of people that comprises a focus of all information in the record and the information that was sent to the client computer by a remote computer, wherein the contact information manager records are not under common content control with the search engine.

12. A non-transitory computer-readable memory medium containing content that, when executed by a client computer system, provides information, the client computer system having access to a database of records of information, each record having associated key words, by performing a method comprising:
    receiving as input a request for a search on at least one word, the search directed via a computer network to a remote search engine that searches a plurality of content servers via the world wide web;
    providing the search request to the remote search engine; and
    checking the associated key words in the database of records for the at least one word, wherein the database of records is not under common content control with the remote search engine, and, if the at least one word is found in the associated key words, displaying information from the record associated with that key word in addition to information from the search engine.

13. The computer-readable memory medium of claim 12 wherein the content are instructions executed by a computer processor of the client computer system.

14. The computer-readable memory medium of claim 12 wherein the database of records is a contact information manager.

15. The computer-readable memory medium of claim 12 wherein the information displayed comprises contact information for a person or group of people.

16. The computer-readable memory medium of claim 12 wherein the information from the record is information sent to the client computer by a remote computer.

17. The computer-readable memory medium of claim 16 wherein the information displayed comprises information about a person or a group of people.

* * * * *